United States Patent [19]

Ikeda et al.

[11] Patent Number: 5,786,835
[45] Date of Patent: Jul. 28, 1998

[54] IMAGE FORMING METHOD, PROCESS FOR PRODUCING DECORATIVE ALUMINUM PLATE, APPARATUS FOR CARRYING OUT THE PROCESS, DECORATIVE ALUMINUM PLATE, AND RECORDING MEDIUM

[75] Inventors: Masami Ikeda, Yokohama; Tsutomu Abe, Isehara; Keisuke Matsuo, Yokohama, all of Japan

[73] Assignee: Canon Kabushiki Kaisha, Tokyo, Japan

[21] Appl. No.: 919,311

[22] Filed: Aug. 28, 1997

Related U.S. Application Data

[63] Continuation of Ser. No. 773,089, Dec. 24, 1996, abandoned, which is a continuation of Ser. No. 300,270, Sep. 2, 1994, abandoned.

[30] Foreign Application Priority Data

Sep. 30, 1993 [JP] Japan ................... 5-244762
Jul. 14, 1994 [JP] Japan ................... 6-162092
Jul. 14, 1994 [JP] Japan ................... 6-162093

[51] Int. Cl.⁶ ........................... B41J 2/01
[52] U.S. Cl. ........................ 347/106; 347/105; 347/102
[58] Field of Search ............... 347/101, 100, 347/102, 105, 106

[56] References Cited

U.S. PATENT DOCUMENTS

| | | |
|---|---|---|
| 3,558,446 | 1/1971 | Blake et al. .................. 101/211 |
| 3,808,000 | 4/1974 | Magnotta et al. . |
| 4,021,252 | 5/1977 | Banczak et al. . |
| 4,136,076 | 1/1979 | Daniels . |
| 4,540,628 | 9/1985 | Oberdeck et al. .................. 347/102 |
| 4,655,136 | 4/1987 | Reiss et al. . |
| 4,970,528 | 11/1990 | Beaufort et al. .................. 347/102 |
| 5,559,708 | 9/1996 | Turnbull et al. .................. 364/468.03 |

FOREIGN PATENT DOCUMENTS

| | | |
|---|---|---|
| 0118740 A2 | 9/1984 | European Pat. Off. . |
| 0244831 A2 | 4/1987 | European Pat. Off. . |
| 2178622 | 11/1973 | France . |
| 2450963 | 11/1975 | Germany . |
| 3010532 | 9/1981 | Germany . |
| 3120975 | 12/1982 | Germany . |
| 54-089732 | 7/1979 | Japan . |
| 57-160688 | 10/1982 | Japan . |
| 60-063341 | 4/1985 | Japan . |
| 62-115074 | 5/1987 | Japan . |
| 2187383 | 7/1990 | Japan . |
| 3-147883 | 6/1991 | Japan . |
| 1449974 | 9/1976 | United Kingdom . |

*Primary Examiner*—Valerie Lund
*Attorney, Agent, or Firm*—Fitzpatrick, Cella, Harper & Scinto

[57] ABSTRACT

Before ink-jet recording, an image forming surface comprising an anodic oxide layer of aluminum or an alloy thereof is dried and activated. After the recording, a treatment to remove solvent components of ink and fix a dye in the ink is applied.

65 Claims, 17 Drawing Sheets

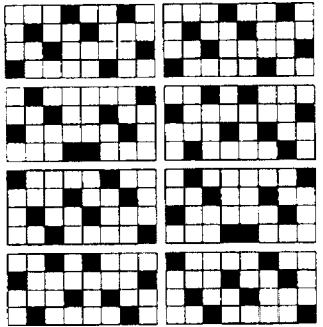
FIG. 11A 1st-pass
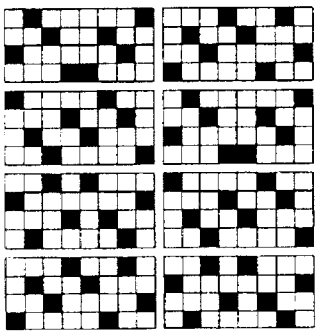
FIG. 11B 2nd-pass
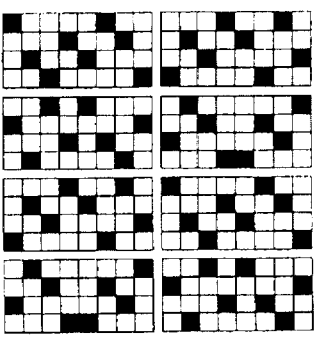
FIG. 11C 3rd-pass
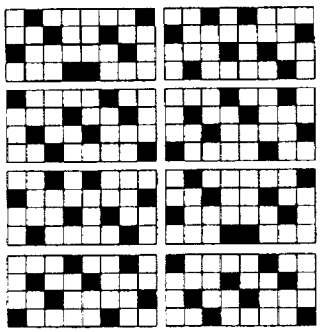
FIG. 11D 4th-pass
Bk
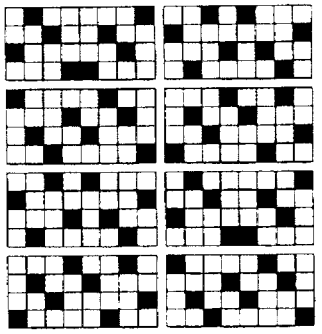
FIG. 11E 1st-pass
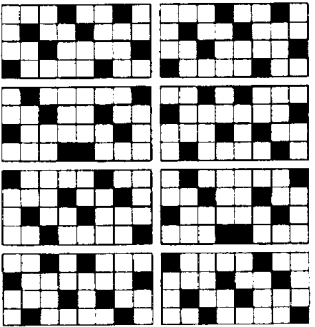
FIG. 11F 2nd-pass
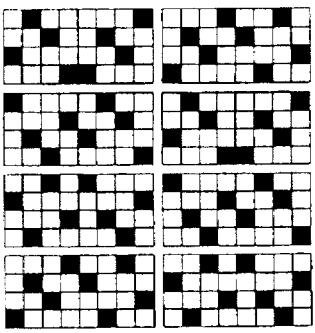
FIG. 11G 3rd-pass
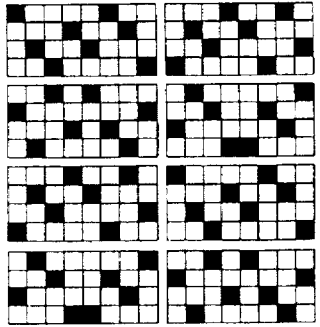
FIG. 11H 4th-pass
C

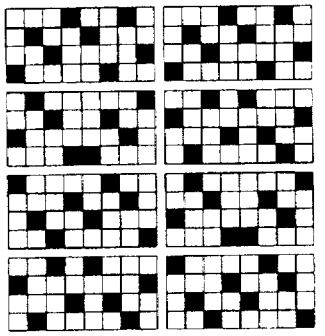
FIG. 12A 1st-pass
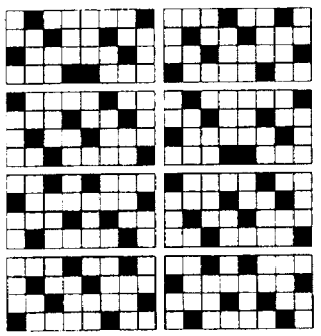
FIG. 12B 2nd-pass
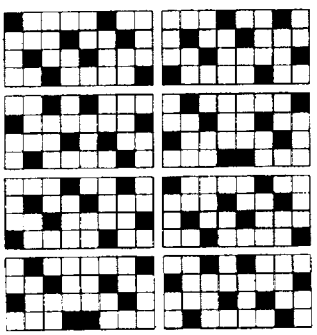
FIG. 12C 3rd-pass
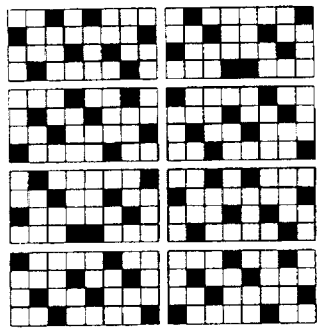
FIG. 12D 4th-pass
M
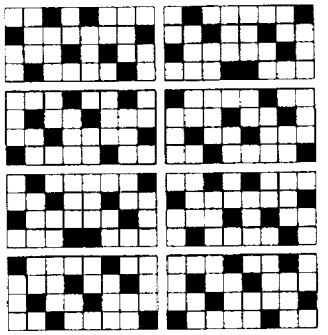
FIG. 12E 1st-pass
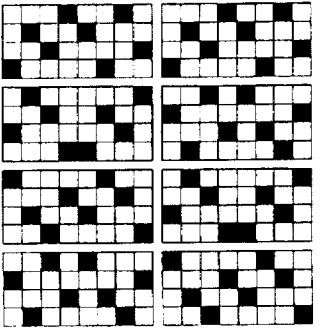
FIG. 12F 2nd-pass
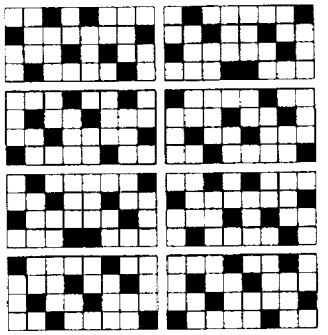
FIG. 12G 3rd-pass
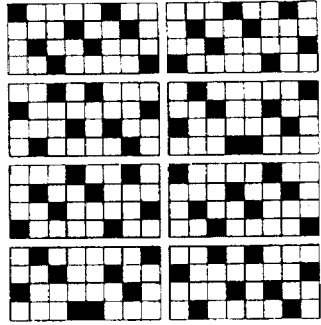
FIG. 12H 4th-pass
Y 70.5   φ 100

IMAGE FORMING METHOD, PROCESS FOR PRODUCING DECORATIVE ALUMINUM PLATE, APPARATUS FOR CARRYING OUT THE PROCESS, DECORATIVE ALUMINUM PLATE, AND RECORDING MEDIUM

This application is a continuation of application Ser. No. 08/773,089, filed Dec. 24, 1996, now abandoned, which is a continuation of application Ser. No. 08/300,270, filed Sep. 2, 1994, abandoned.

BACKGROUND OF THE INVENTION

1. Field of the Invention

This invention relates to an image forming method by which characters, figured patterns, pictures or the like are recorded on recording mediums having a plate, sheet or foil made of aluminum or aluminum alloy (hereinafter often simply "aluminum sheet"), as exemplified by nameplates, display boards, construction wall materials, automobile panels and parts, tableware, aluminum cans and interior decorative panels. It also relates to a process for producing a decorative aluminum plate, an apparatus used for carrying out such a process, and an decorative aluminum sheet obtained by such a process. The present invention also relates to an ink and a recording medium that are used to make a record on an aluminum anodic oxide layer.

2. Related Background Art

As recording mediums for ink-jet recording, paper is in general use. Those made of other than paper are limited to plastic films provided on at least one side thereof a layer endowed with ink absorption properties by a special treatment. This is considered due to the fact that ink-jet recording apparatus have been mainly used for office work and hence records are mostly made on paper serving as an information medium and also that recording mediums are required to have ink absorption properties and fixing properties on account of the ink-jet recording system in which ink droplets are caused to fly and adhere to recording mediums.

Under such circumstances, as ink-jet recording apparatus are made to have a higher speed and a higher function, the application of ink-jet recording to recording mediums made of materials other than paper or plastic film is attracting notice. In particular, ink-jet recording on metallic materials such as aluminum or alloys thereof is expected not only to make it possible to provide a simpler recording process applicable on metallic materials, which can substitute printing or the like, but also to promote the expansion of use of articles made of metallic materials and on which characters, patterns, pictures or the like have been recorded.

Metallic materials utilized in a variety of fields and uses may include aluminum and alloys thereof. In particular, aluminum materials on the surfaces of which anodic oxide layers, what is called aluminum anodic oxide layers, are formed to improve the corrosion resistance, surface strength and decorativeness of aluminum have been hitherto used in construction materials, tableware, panels for electronic machinery, etc., and also in radiator panels or the like utilizing good heat dissipation properties of such layers. In particular, because the aluminum anodic oxide layers can be colored with ease, members having aluminum anodic oxide layers are also used as decorated wallboard materials or door members, as well as artistic decorations themselves. They are also in wide use as personal nameplates of various types.

As methods for coloring or recording on aluminum anodic oxide layers (or anodic oxide layers), photographic printing is in general use. In this method, a series of steps of coating a resist, exposing, developing, dipping in a recording solution (dye solution) with a given color and stripping the resist are repeated for each color to form a color image by the use of multi-color recording solutions.

The photographic printing conventionally used in the recording on the materials made of aluminum or alloys thereof on which anodic oxide layers have been formed requires a large number of processing steps, which is complicated and takes a long time, and hence the number of steps and the processing time greatly increases with an increase in the number of colors of the recording solutions. Thus, there is a limit to the processing of a large quantity of materials.

Now, the ink-jet recording that enables color recording at a high speed may be applied to such processing. This makes it possible to greatly shorten the processing time and improve the productivity, and also makes it unnecessary to use developing solutions, washing solutions and so forth necessary for the photographic printing, so that a great cost reduction can be achieved. This also can solve the problems of environmental pollution caused by, or disposal of, waste liquors such as developing solutions and washing solutions after their use.

The application of ink-jet recording to aluminum anodic oxide layers is disclosed, for example, in Japanese Patent Applications Laid-open No. 62-115074 and No. 3-147883. The methods disclosed in these publications, however, are nothing but those in which the conventional ink-jet recording is directly applied to sheet materials having aluminum anodic oxide layers.

In the ink-jet recording, ink wettability, ink absorption properties and ink fixing properties of recording mediums are especially important. If the recording mediums have poor fixing properties, ink droplets first shot for recording and ink droplets subsequently shot for recording may mix to cause color mixture to give no desired color reproduction and sharpness. If the recording mediums have a poor wettability on their surfaces, the ink may be repelled on the surfaces, so that no good images can be obtained.

However, the aluminum anodic oxide layers as stated above are not necessarily satisfactory in respect of the ink wettability, ink absorption properties and ink fixing properties. Hence, the mere direct application of ink-jet recording to aluminum anodic oxide layers causes the following problems, and can not necessarily be said to be practical.

The ink imparted to aluminum anodic oxide layers is little absorbed in the anodic oxide layer, and ink droplets mix on its surface, resulting in a blurred image. The aluminum anodic oxide layers also have so poor of ink fixing properties that various rollers pertaining to the transport of recording mediums and the control of recording position in the ink-jet recording apparatus may come in touch with the areas in which the ink has not been fixed, and hence any marks of a roller rub may appear on the surface to damage recorded images.

Meanwhile, ink-jet recording carried out using as an ink component a hitherto well known dye for anodized aluminum also has the disadvantage that the surfaces of aluminum anodic oxide layers can not be colored well and no satisfactory colors can be obtained especially in the case of deep colors.

In addition, usual ink-jet recording, in which a recording head having a number of nozzles carries out simultaneous recording in order to increase printing speed, has another disadvantage that, when lines are recorded in an unfixed state, the ink of a line first drawn is pulled toward the ink of a line subsequently drawn, to cause a higher density at some part for each line, that is, to cause uneven lines.

Thus, it can not be said to be practical that the high-speed color recording carried out by ink-jet recording is directly applied to the recording mediums made of materials other than paper or the like conventionally used, e.g., those made of metals having aluminum anodic oxide layers.

Meanwhile, ink-jet recording apparatus used for can manufacturing and for lot-number printing have been put into practical use. Most of them, however, make use of oil-based inks or pigment type inks, and can not fly ink droplets having diameter small enough to form highly minute images or tend to cause clogging when nozzles are arranged in a high density. Thus, the fields to which they can be applied are limited, and they can not be said to be practical for the recording of more highly minute images. Moreover, in the ink-jet recording apparatus used for such purposes, their nozzles can not have a sufficient work precision and can only have a nozzle density of several nozzles/mm at best. Hence, it has been difficult to form more highly minute images and there has been a problem in the image quality when applied to decorative purpose. Thus, it also can not be said to be practical that the ink-jet recording used in this field is applied to the recording on aluminum anodic oxide layers.

As discussed above, the mere application of conventional ink-jet recording to the aluminum anodic oxide layers of aluminum or alloys thereof has brought about the following problems.

1) Mixing between colors (i.e. bleeding) may occur to cause blurred images.

2) Uneven lines may occur in the recording scans of recording heads.

3) Unfixed ink is transferred to transport rollers and so forth inside the apparatus to cause ghost images and crushed images.

4) Color ink has so poor a coloring ability to the aluminum anodic oxide layers that rinsing after printing may cause a decrease in image density, resulting in a low density.

SUMMARY OF THE INVENTION

The present invention has been made taking account of these problems, and intends to provide an image forming process, a process for producing a decorative aluminum sheet and an apparatus for its production that are necessary for a technique in which an ink-jet recording system is employed to form on anodic oxide layers, images having a superior image performance, e.g., free of color mixture, uneven scans and crushed images and having a sufficient color density. The present invention also intends to provide a decorative aluminum sheet having a superior image performance, formed by such a technique.

The image forming process for producing a decorative aluminum plate, sheet or foil according to the present invention that can achieve the above objects is an ink-jet recording process for forming a recorded image by imparting ink droplets of at least one color from a recording head having a plurality of ink ejection orifices to an anodic oxide layer formed on the surface of a plate, sheet or foil made of aluminum or an aluminum alloy, the process comprising;

a first step of dehydrating and activating the anodic oxide layer;

a second step for the formation of a recorded image by causing the ink droplets to fly from the ejection orifices in accordance with image recording signals and applying the ink droplets to a desired position of the anodic oxide layer thus dehydrated and activated; and a third step of fixing a dye contained in the ink droplets having adhered to the anodic oxide layer on which the recorded image has been formed, into the anodic oxide layer, and removing volatile components contained in the ink droplets from the anodic oxide layer.

In the process of the present invention, multi-color inks are preferably used as the ink so that a colored recorded image can be formed. In the process of the present invention, each treatment applied to the anodic oxide layer in at least one of the first step and the third step is carried out by a treatment selected from a treatment of heating the layer, a treatment by electromagnetic induction and a treatment by dry-air spraying. Two or more treatments of these may be used in combination. The third step may also comprise a treatment by rinsing with water.

In the process of the present invention, the second step may preferably be carried out by bubble jet recording system.

As for the apparatus for producing a decorative aluminum plate, sheet or foil according to the present invention, it is an apparatus for forming a recorded image on a recording medium having an anodic oxide layer formed on the surface of a plate, sheet or foil made of aluminum or an aluminum alloy, by imparting ink droplets of at least one color to the anodic oxide layer formed thereon, the apparatus comprising;

(a) a means for dehydrating and activating the anodic oxide layer;

(b) a recording head having a plurality of ink ejection orifices from which the ink droplets are caused to fly in accordance with image recording signals and imparted to a desired position of the anodic oxide layer thus dehydrated and activated; and (c) a means for fixing a dye contained in the ink droplets having adhered to the anodic oxide layer on which the recorded image has been formed, into the anodic oxide layer, and removing volatile components contained in the ink droplets from the anodic oxide layer.

The apparatus of the present invention may preferably further comprise a means (d) for transporting the recording medium under heat insulation. The apparatus may also preferably further comprise a means (e) for detecting the temperature of the recording medium, a means (f) for controlling at least one operation of the means (a) and (c) in accordance with the information on the temperature, obtained in the temperature detecting means (e), or a means (g) for controlling the transport of the recording head (b) in its primary scanning direction and secondary scanning direction in accordance with the information sent from the temperature detecting means (e), or may preferably further comprise all of these means (e), (f) and (g).

The present invention also provides an ink used for making a record on an anodic oxide layer formed on the surface of a plate, sheet or foil made of aluminum or an aluminum alloy;

the ink comprising a dye having at least one group having a high reactivity.

The present invention still also provides a recording medium used in a process for forming an image by imparting ink droplets to an anodic oxide layer formed on the surface of a plate, sheet or foil made of aluminum or an aluminum alloy;

the recording medium comprising an image forming surface overall provided with concavities smaller than the ink droplets and having ridges along their peripheries, and an anodic oxide layer formed thereon.

The present invention further provides a recording medium used in a process for forming an image by imparting ink droplets to an anodic oxide layer formed on the surface of a plate, sheet or foil made of aluminum or an aluminum alloy;

the recording medium being stored by a storage means for keeping the image forming surface away from the atmosphere until the image is formed by the method.

The present invention still further provides a decorative aluminum plate, sheet or foil comprising a plate, sheet or foil made of aluminum or an alloy thereof and an anodic oxide layer formed on its surface and on which an image has been formed by imparting ink droplets;

the aluminum plate, sheet or foil being provided on its surface with concavities smaller than the ink droplets and having ridges along their peripheries.

The present invention still further provides an image forming process for producing a decorative aluminum plate, sheet or foil, which utilizes an ink-jet recording process for forming a recorded image by imparting ink droplets of at least one color from a recording head having a plurality of ink ejection orifices to an anodic oxide layer formed on the surface of a plate, sheet or foil made of aluminum or an aluminum alloy; the process comprising;

a first step of dehydrating and activating the anodic oxide layer;

a second step for the formation of a recorded image by causing the ink droplets to fly from the ejection orifices in accordance with image recording signals to a desired position of the anodic oxide layer thus dehydrated and activated, and recording a dot-interval image plural times by scanning the recording head plural times; and a third step of fixing a dye contained in the ink droplets having adhered to the anodic oxide layer on which the recorded image has been formed, into the anodic oxide layer, and removing volatile components contained in the ink droplets from the anodic oxide layer.

The present invention still further provides an image forming process for producing a decorative aluminum plate, sheet or foil, which utilizes an ink-jet recording process comprising a first step of forming a recorded image by imparting ink droplets of at least one color from a recording head having a plurality of ink ejection orifices to an anodic oxide layer formed on the surface of a plate, sheet or foil made of aluminum or an aluminum alloy, and a second step of applying an aqueous polyvalent metal salt solution to the anodic oxide layer on which the recorded image has been formed.

BRIEF DESCRIPTION OF THE DRAWINGS

FIGS. 11A to 11D illustrate specific examples in which patterns are changed in 1st-pass to 4th-pass, respectively, for a black color to make a record in the ink-jet color recording of the present invention.

FIGS. 11E to 11H illustrate specific examples in which patterns are changed in 1st-pass to 4th-pass, respectively, for a cyan color to make a record in the ink-jet color recording of the present invention.

FIGS. 12A to 12D also illustrate specific examples in which patterns are changed in 1st-pass to 4th-pass, respectively, for a magenta color to make a record in the ink-jet color recording of the present invention.

FIGS. 12E to 12H illustrate specific examples in which patterns are changed in 1st-pass to 4th-pass, respectively, for a yellow color to make a record in the ink-jet color recording of the present invention.

DESCRIPTION OF THE PREFERRED EMBODIMENTS

The recording medium according to the present invention comprises an anodic oxide layer formed on the surface of a plate, sheet or foil made of aluminum or an alloy thereof. The recording medium may also have a laminated structure in which the plate, sheet or foil made of aluminum or an alloy thereof is provided on a base comprised of a material other than aluminum or an alloy thereof, including various materials (substrate materials) as exemplified by a clad material.

Regarding the aluminum or an alloy thereof used in the present invention, there are no particular limitations thereon so long as they are capable of forming the anodic oxide layer. For example, it is possible to use sheet or foil materials of a pure aluminum type such as those prescribed in JIS-1050 and sheet or foil materials made of an aluminum alloy used for anodized aluminum, such as an alloy containing Mg.

Figure 2A:
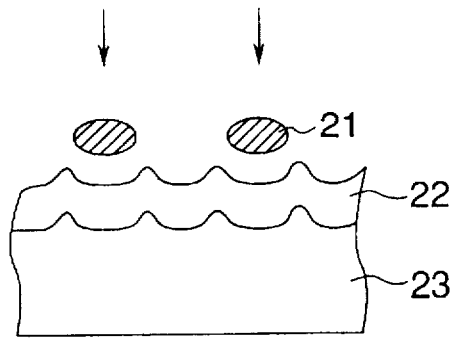
FIGS. 2A to 2C and 2D to 2F each illustrate the surface configuration of an aluminum or aluminum alloy material and how bleeding occurs or does not occur.
Figure 2D:
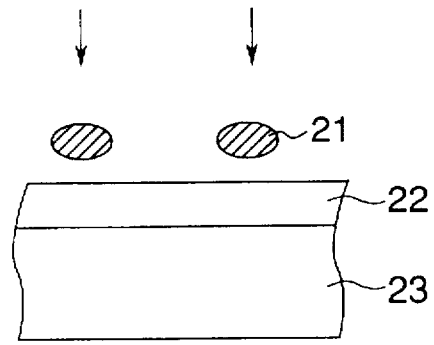
Figure 2B:
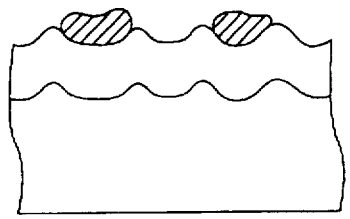
Figure 2E:
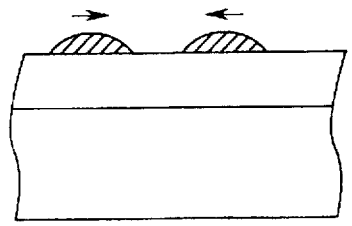
Figure 2C:
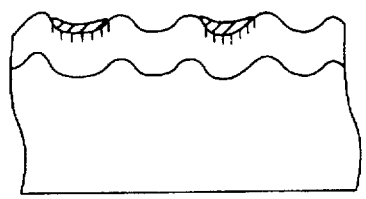
Figure 2F:
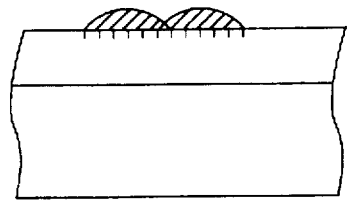

The surface of the plate, sheet or foil made of aluminum or an alloy thereof which is a material worked in a desired shape and size by means of a press machine or the like so as not to cause any unauthorized deformation such as warpage or flashes and on which the anodic oxide layer is formed to provide an image forming surface, may preferably be treated, if necessary, by a mechanical means or chemical polishing to control its surface properties so that good images can be formed in the course of recording. This surface treatment can be exemplified by a treatment of providing concavities smaller than ink droplets and having ridges along their peripheries, over the whole image forming surface. Such a surface treatment makes it possible to prevent ink, having impacted on a desired position, from mixing with ink having impacted on other regions or moving to other regions to cause bleeding. In particular, since aluminum sheet materials commonly available are rolled materials, marks (grooves) of rolling extend in one direction, and the ink tends to run along the marks of rolling, so that inks tend to cause color mixture in the direction of rolling. Accordingly, the concavities with a diameter smaller than the ink droplets are formed over the whole surface, whereby such color mixture can be prevented. The diameter of a concavity may be set in accordance with the diameter of an ink droplet. For example, ink droplets each have a diameter of about 100 μm under recording conditions of 360 dpi, and hence any surface treatment method that can make a concavity having a diameter of smaller than 100 μm may be selected and used. FIGS. 2A through 2C, along stages FIGS. 2A to FIG. 2C thereof, diagrammatically illustrate a mechanism by which the bleeding can be prevented on the surface provided with such concavities. FIGS. 2D through 2F, along stages FIG. 2D to FIG. 2F thereof, diagrammatically illustrate typical examples in which the bleeding occurs. In FIGS. 2A and 2D, reference numeral 21 denotes ink droplets; 22, an anodic oxide layer; and 23, an aluminum plate.

This surface treatment can be made using a mechanical working process in which a beads type abrasive is sprayed on the surface, e.g., shot blasting, or a chemical process making use of an etching solution. The treatment may preferably be made by chemical polishing that can effectively form concavities having ridges around their peripheries on account of the generation of gas and the presence of grain boundaries at the time when the recording medium is immersed in an etching solution.

The surface of the material on which the anodic oxide layer is to be formed is further optionally subjected to degreasing and pickling that are commonly carried out, and thereafter the anodic oxide layer is formed by anodizing in, for example, a sulfuric acid bath, followed by rinsing with water. The anodic oxide layer is formed in a layer thickness of, for example, from 5 to 25 μm.

Figure 1:
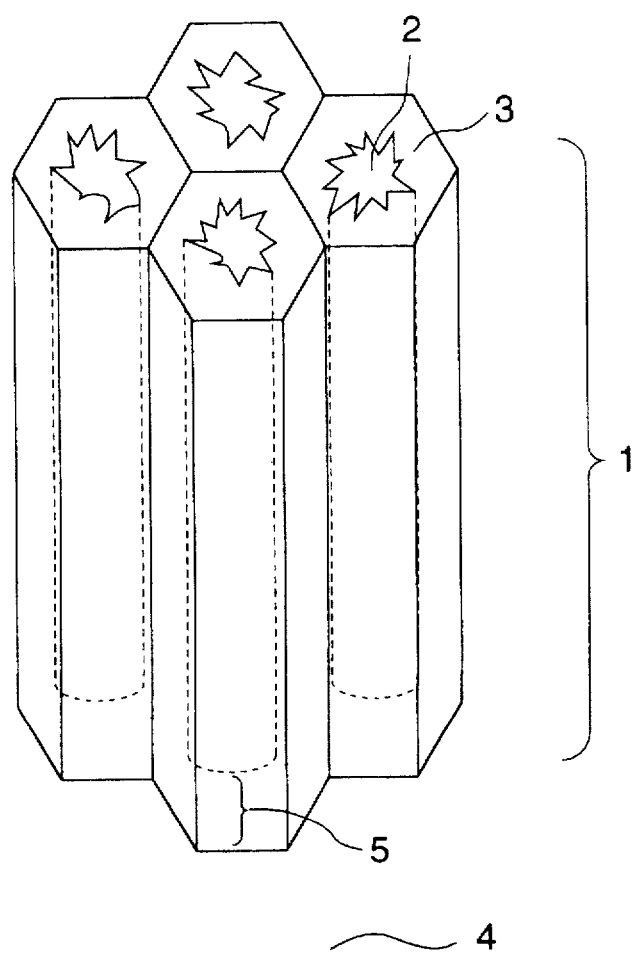
FIG. 1 diagrammatically illustrates the structure of an anodic oxide layer of aluminum or an alloy thereof.

FIG. 1 diagrammatically illustrates the structure of an anodic oxide layer of aluminum or an alloy thereof. An anodic oxide layer 1 formed on the surface of a base 4 comprised of aluminum or an alloy thereof is constituted of a large number of cells 3, and a pore (a minute opening) 2 is formed substantially at the center of each cell. The bottom of this pore 2 is constituted of a barrier layer 5 located at the boundary between the pore and the base 4.

Accordingly, the larger diameter the pore has, the higher the coloring ability and ink receptivity become. Also, the deeper the pore is, the higher the ink receptivity becomes. Hence, as a condition for electrolysis in the anodizing, it is preferable to select conditions under which pores can be formed in such a state.

The diameter or depth of the pore 2 can be increased by a treatment made at a higher temperature or using an electrolytic solution with a higher density. If, however, the thickness of the barrier layer 5 becomes smaller, the material may cause a decrease in its own corrosion resistance. Hence, the conditions for electrolysis should be selected taking account of these factors.

For example, as the compostion of the electrolytic solution, a solution of 10 to 30% (weight ratio) of sulfuric acid is prepared. A SUS (a kind of stainless steels) plate is used as the cathode, and an aluminum sheet having been subjected to the pretreatment described above and also subjected to degreasing, rinsing with water and desmutting before the anodizing is set on the anode. In an electrolytic bath controlled to have a bath temperature of about 25° C. and also well agitated, the anodizing is carried out at a current density of from 60 to 300 mA/m$^2$ for a suitable time until the required layer thickness is achieved. Thereafter, the treated product is taken out of the electrolytic bath, thoroughly rinsed with water, dried, and then stored.

The above electrolysis may be divided into two stages, where conditions under which large-sized pores are formed are employed in the first stage and conditions under which small-sized pores are formed are employed in the second stage so that the barrier layer can be made to grow on the substrate side to improve corrosion resistance. Such a method is also effective. In this case, the treatment at the second stage may be carried out in the same bath as that for the first stage, or may be carried out in a bath different from that for the fist stage. In order to grow the barrier layer, it is also effective to use a boric acid type electrolytic solution.

In this way, the image forming surface comprised of the anodic oxide layer is formed on the surface of the base comprising the plate, sheet or foil of aluminum or an alloy thereof. The recording medium thus obtained is stored if necessary, and thereafter treated in the first step of ink-jet recording carried out in the image forming method of the present invention.

When the recording medium is stored, the state of its storage may greatly influence the operation of image formation and the state of storage should preferably be controlled so as to be suited for the desired end. As described in relation to FIG. 1, the anodic oxide layer is constituted of a number of cells having pores, and the presence of these pores makes it possible for the ink to be absorbed into the layer to make a record. If, however, the anodic oxide layer is left to stand in an atmosphere containing water (vapor) and oxygen as in the air, a hydroxide is formed on the layer as a result of the reaction of water with oxygen. If it is formed in the pores, the pores becomes narrow or may be closed. As the reaction proceeds, almost all the pores in the layer are brought into the state of being closed. A decrease in pore volume or the closure of pores results in a decrease in ink receptivity (ink absorption), and brings about the problem that the image quality tends to deteriorate because of occurrence of bleeding and color mixture. Hence, in the storage of the recording medium, it is preferable to shut off water content and oxygen. As a manner of storing the recording medium, the recording medium may preferably be stored in a container into which nitrogen gas can be flowed to form an atmosphere of nitrogen gas, be stored in a container into which a moisture-proofing agent such as silica gel or a deoxidizing agent can be put to form an atmosphere of dry air, or be kept away or shut off from the open air.

Figure 3:
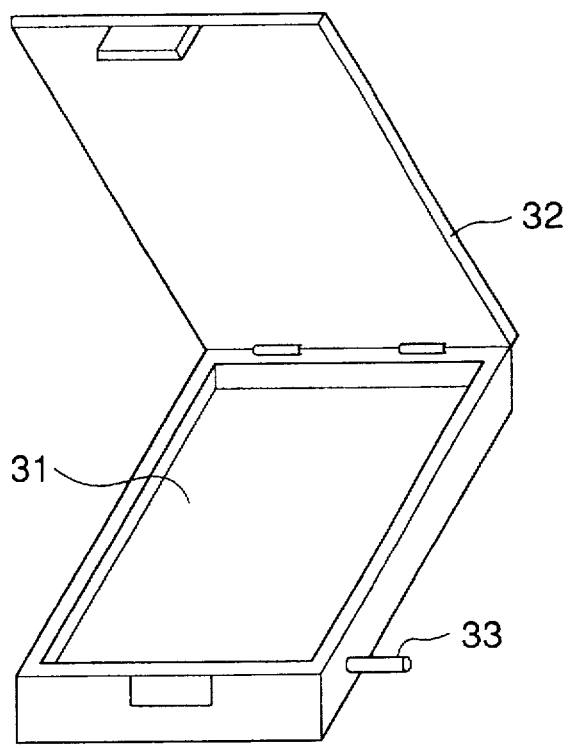
FIG. 3 illustrates a manner of the storage of a recording medium on which the anodic oxide layer has been formed.
Figure 4:
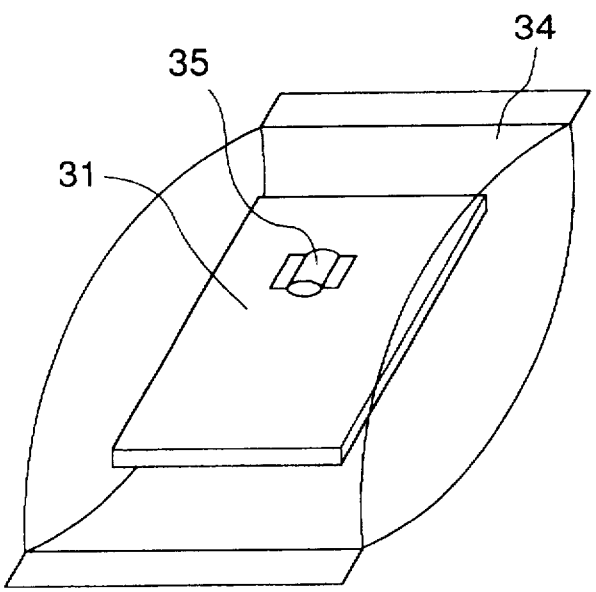
FIG. 4 also illustrates a manner of the storage of a recording medium on which the anodic oxide layer has been formed.
Figure 5:
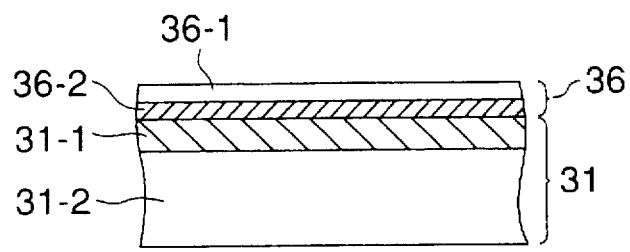
FIG. 5 still also illustrates a manner of the storage of a recording medium on which the anodic oxide layer has been formed.

Examples of the manner of storage are shown in FIGS. 3 to 5. FIG. 3 shows a storage box 32 provided with a nitrogen gas blow pipe (an $N_2$ blow pipe) 33, where the inside of the box is replaced by nitrogen so that the recording medium 31 can be stored. FIG. 4 shows a bag 34 made of resin, in which a deoxidizing agent 35 is put together with the recording medium 31 for its storage under a sealed state. The manner of storage shown in FIG. 5 is a manner in which the surface of an anodic oxide layer 31-1 formed on a base 31-2 comprised of aluminum or an alloy thereof is covered with an adhesive tape 36 comprised of an oxygen and vapor barrier film 36-1 such as polyethylene terephthalate film and an adhesive layer 36-2 formed on its surface to hermetically seal the former so that the recording medium can be stored in the state it is kept away from contact with the atmosphere.

In the first step of the ink-jet recording of the present invention, the anodic oxide layer constituting the surface of the image forming surface of the recording medium is dehydrated and activated.

This treatment causes the aluminum anodic oxide layer to undergo dehydration and condensation of the water content adsorbed on boehmite AlO(OH) and alumina $\gamma$-$Al_2O_3$ formed on the outer surface when the layer is formed, so that activation points are formed thereon. The activation points react with water content in the atmosphere and behave so as to immediately return to the original state. Hence, it is important for this treatment to be carried out immediately before the step of recording. Once the activation points have been formed, reactive groups of the dye contained in the ink combine at these points, so that the coloring ability is improved. There is also an advantageous effect that the water content in the ink is absorbed to increase the quantity of ink reception.

In this first step, a heat treatment, an electromagnetic induction treatment or a treatment by dry-air blowing can be utilized. In the dry air, active gas such as $H_2$ or $O_3$ may be mixed. A method of applying a charge treatment by corona discharging may also be used.

Stated specifically, for example, dry air heated to 60° C. is blown on the aluminum anodic oxide layer at a rate of about 20 liter/min through an opening of 20 cm×5 cm. The aluminum sheet on which this aluminum anodic oxide layer has been formed is passed through the above opening at a speed of about 30 cm/min, and then transported to an ink-jet recording zone. Since this treatment can not be too effective if the atmosphere or the aluminum sheet has a low temperature, a tray for the transport may preferably be provided with a sheet heater so that the sheet can be preliminarily heated up to about 60° C.

At the time the treatment in the first step has been completed, ink-jet recording (the second step) is carried out on the recording medium. In the ink-jet recording in the second step, any recording apparatus and recording system applied to usual recording mediums such as paper can be used.

With regard to ink, there are no particular limitations thereon so long as it can achieve the desired end. An ink making use of a coloring matter (a dye) having a good coloring ability to the anodic oxide layer is preferred. More specifically, in the case of the anodic oxide layer of aluminum or an alloy thereof, the oxide layer is formed by anodizing carried out under application of a direct current or an alternating current in an electrolytic solution of sulfuric acid or the like, setting the aluminum or an alloy thereof to serve as the anode. Hence, the layer is in a state of still containing many kinds of intermediate products formed when the aluminum or an alloy thereof is changed into its oxide in the course of the dehydration and condensation in the anodizing reaction. The intermediate products are rich in reactivity (e.g., boehmite). Thus, use of a dye highly reactive with such intermediate products enables improvement of the coloring ability. Such a dye may include, for example, dyes having at least one kind of anionic groups. In particular, dyes having a carboxyl group and/or a sulfonic group are preferred.

The pH of the ink may preferably be on the alkaline side rather than the acid side. This is presumably because the layer is formed on the anode side and tends to be dissolved on the alkaline side.

With regard to solvent components of the ink, there are no particular limitations thereon so long as it can achieve the desired end. However, nonvolatile solvents such as glycerol utilized in conventional ink-jet recording inks used on paper or the like and glycols having a high molecular weight remain on the image forming surface after volatile solvents have been evaporated, as shown, for example, in FIG. 6.

Figure 6:
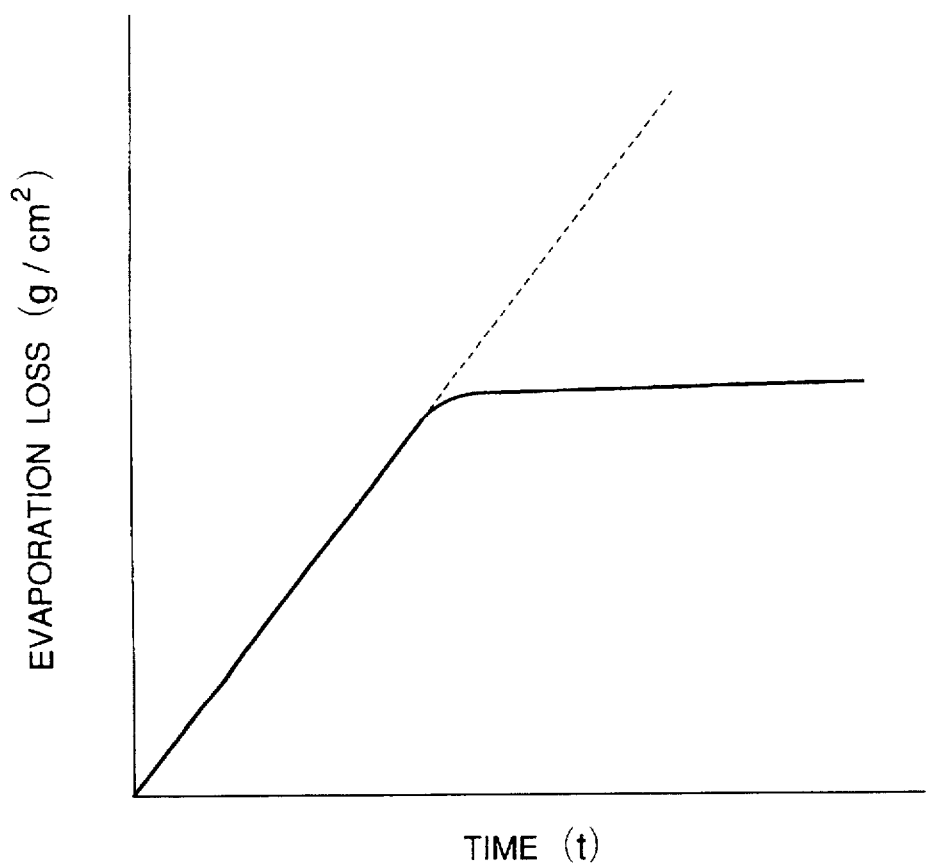
FIG. 6 is a graph to show the state of evaporation of a solvent commonly used in ink-jet recording inks.

FIG. 6 graphically show an evaporation loss with time of an ink containing a non-volatile solvent. FIG. 6 shows the evaporation loss of the ink put in a laboratory dish under dry conditions of 60° C. The evaporation loss is indicated on the ordinate, and the time on the abscissa. First, volatile components evaporate when the ink is put in at 60° C., and the evaporation loss increases with the rate of evaporation, where the quantity of ink is kept constant when the volatile components have completely evaporated and only non-volatile components have remained. If it is a quantity more than that acceptable in cells, the surrounding ink droplets may mutually mix to cause bleeding, possibly resulting in a deterioration of image quality.

In the case of paper, cloth or recording mediums so constructed that a base material of the image forming surface is capable of absorbing solvents, such non-volatile solvents permeate into the base material and hence have no influence, or only an influence small enough to be ignorable, on the dyes constituting the image on the surface layer. On the other hand, the permeation of non-volatile solvents in the direction of the base material as in the case when paper or the like is used do not occur in the case of the anodic oxide layer formed on the surface of aluminum or an alloy thereof, and hence the solvents remain in the layer to cause color mixture, blur, bleeding or the like. Inks prepared using only water and dyes can not be endowed with a viscosity suitable for the generation of bubbles in apparatus and for the recording. For such reasons, the use of such non-volatile solvents in ink is indispensable for enabling effective operation of ink-jet recording apparatus. Accordingly, in order to prevent the problems caused by non-volatile solvents, the content of a non-volatile solvent in ink may preferably be so controlled that the non-volatile solvent holds a volume smaller than the total volume of the pores present in the region where ink droplets impact against and spread on the image forming surface.

The ink absorption in the anodic oxide layer is governed by the volume of pores. Hence, in the ink-jet recording of the present invention the dye in ink may preferably be in a shot-in quantity set in accordance with the structure of the anodic oxide layer constituting the image forming surface, in particular, in accordance with the volume of pores. For example, when the anodic oxide layer having the structure as shown in FIG. 1 has a cell diameter of about 400 angstroms, a pore diameter of about 100 angstroms and a pore depth of about 10 μm and the recording is carried out under conditions of 400 dpi, it follows that one picture element has a side of about 63 μm and hence about 2,400,000 cells are present in it, having pores with an internal volume of about 0.0008 μm³ per pore. Thus, the total volume of the pores per picture element comes to be about 1,900 μm³. A value obtained by dividing this total volume by the area of one picture element is a reception height, which comes to be 0.46 μm. In this case, the dye concentration in ink is governed by this reception height. In the case when the volume per unit ink droplet (ejection quantity) is 30 ng, the reception height of 0.43 μm gives a dye concentration of about 3%. From the viewpoint of the degree of coloring and the reflection O.D. (optical density) at colored areas, the reception height may preferably be 0.2 μm or more in order to obtain sharp images. In the formation of the anodic oxide layer, the conditions for analysis should be so set that the layer thickness, cell density and pore size that satisfy this reception height can be obtained.

In setting conditions as described above, when the ink ejection quantity is 30 ng and the reception height (hereinafter also often "reception quantity") of the aluminum anodic oxide layer is 0.46 μm, what is important is that the tolerance of non-volatile components contained in the ink is not more than the above reception quantity of the layer. Thus, it has become clear that the image bleeding can be prevented when the non-volatile solvent is controlled to be mixed in an amount of 6% by weight or less.

This amount depends on the shapes of cells and pores and the layer thickness of the anodic oxide (anodized aluminum) layer. Namely, when the layer thickness is about 20 μm, the non-volatile solvent can be mixed in an amount at least twice as much as the foregoing. When the cells have a high density and also when the pores are large in size, it can be mixed in a much greater amount. However, its upper limit is about 10% in the case of usual aluminum anodic oxide layers, and should preferably be in an amount of 5% or less.

If the non-volatile solvent is completely removed, the ink-jet recording head may clog or the first-ejection performance may become poor, rather often resulting in a deterioration of image quality. Hence, it is important for the non-volatile solvent to be mixed in an optimum amount within the above range.

The non-volatile components mentioned above are comprised of dyes, as well as diethylene glycol, triethanolamine, polyethylene glycol, glycerol, urea or the like. They may be any kinds of solvents and additives so long as they have a good I/J (ink jet) suitability and do not adversely affect the printing on aluminum anodic oxide layers.

In the bubble-jet recording, the volatile components mentioned above are solvents capable of bubbling upon heating, which may include water, IPA, acetone and alcohols, and may be any solvents so long as they have a good I/J suitability and do not adversely affect the printing on aluminum anodic oxide layers.

The volatile components should preferably have an evaporation rate ranging from $1.0 \times 10^{-5}$ g/mm²·sec to $1.0 \times 10^{-7}$ g/mm²·sec in the state that all solvents have mixed and in a dry environment of 60° C. Here, ink droplets shot in the aluminum anodic oxide layer surface completely evaporate in a time of from several seconds to several ten seconds, so that the ink droplets become dry in one scan to several scans and high-quality images can be recorded without blur or bleeding.

At the time the ink-jet recording has been completed, the image formed on the image forming surface is subjected to the third step, i.e. the step of evaporating the solvent components in the anodic oxide layer, on which the image has been formed, so that dye components of the ink can be fixed.

In this third step, the coloring component contained in ink is the dye. Other components are components necessary at the time of ink-jet recording and are components unnecessary after the aluminum anodic oxide layer has been colored. Hence, such unnecessary components must be removed as soon as the dye in ink has been received in the cells after recording and its dyeing reaction with the layer has been completed.

First, in order to make the dye and the layer undergo a fixing rection with a good efficiency, it is important to heat the layer itself to accelerate the reaction. Next, in order to deposit the dye in the pores of cells, the volatile components in the ink should be made to evaporate as soon as possible to retain the dye in the cells. This is important for the formation of images with a high quality.

The ejection quantity is usually so designed as to provide a maximum recording density, and hence the dye is contained in an amount set at a maximum value of the reception quantity of the coating. Since, however, the head may eject the ink in a greatly uneven quantity, a phenomenon may occur such that the ink is shot in a quantity more than the reception quantity of the coating. Moreover, to form an image, multi-color inks can be shot in the same site, and a dye itself may become an unnecessary component, which therefore remains on the layer. When the dye remains on the layer in this way, the dye may exude when sealing is subsequently performed in order to improve corrosion resistance of the aluminum anodic oxide layer. This may cause a deterioration of image quality, or, if the product is used as it is, the dye may similarly exude in an environment in which resistance to water or sweating is required, resulting in no durability of image quality.

An example of a specific manner by which the components unnecessary after recording as stated above will be described below.

First, the aluminum sheet on which the aluminum anodic oxide layer has been formed and having been subjected to the ink-jet recording is heated with three infrared lamps of 500 W from the upper part while it is passed over a heat sheet of 1,000 W at the lower part, which is passed at a rate of travel of about 30 cm/min. In this example, four colors of Y, M, C and Bk are superimposingly shot. Accordingly, the recorded surface is rinsed with pure water as a post-treatment to remove excess dyes, followed by drying to obtain an image-recorded product. Thereafter, this image-recorded product is immersed for 10 minutes in boiling pure water of about 100° C., to carry out sealing of the aluminum anodic oxide layer, followed by drying to obtain a finished product.

In the present invention, at the time the ink-jet recording has been completed, an aqueous polyvalent metal salt solution may be applied to the image formed on the image forming surface. This makes it possible to produce an image-recorded product having a fastness to light.

The aqueous polyvalent metal salt solution comprises polyvalent metal cations such as $Cu^{++}$, $Ni^{++}$ and $Al^{++}$. Examples are by no means limited to these, and other polyvalent metal cations may be used so long as the same effect can be obtained.

As anions that combine with such cations include $Cl^-$, $ClCO_3^-$ and $CH_3COO^-$. Of course, examples are by no means limited to these.

This aqueous polyvalent metal salt solution should have a salt concentration of from 0.05 to 50% by weight, and preferably from 0.2 to 30% by weight.

The polyvalent metal cations in the solution react with the reactive groups of the dye, e.g., carboxyl groups and sulfonic groups, to form a dye complex. As previously stated, dyes highly reactive with intermediate products, in particular, dyes having reactive groups such as carboxyl groups or sulfonic groups are preferred. Use of such dyes facilitates the reaction with polyvalent metal cations, so that the dye complex can be formed with ease. The formation of such a dye complex can prevent decomposition of dye molecules and prevent any discoloration or color change due to changes with time.

As a method for applying the aqueous polyvalent metal salt solution to the image formed on the image forming surface, the aqueous polyvalent metal salt solution may be sprayed on the anodic oxide layer by means of a sprayer or the like, in case of the use as an interior decoration. It is more preferable to wash the anodic oxide layer with the aqueous polyvalent metal salt solution.

When image-recorded products are used outdoors and require a reliability, it is preferable to carry out sealing of the anodic oxide layer using the aqueous polyvalent metal salt solution.

The relationship between the aluminum anodic oxide cell configuration and the shot-in ink quantity will be further detailed below.

In the aluminum anodic oxide cell structure as shown in FIG. 1, diameter of the cell is A µm, diameter of the pore formed in the cells is a µm, and layer thickness is L µm. Here, the respective aluminum anodic oxide cells are arranged in the form of substantially regular hexagons and hence have a cell surface area Sc of:

$$S_c = \frac{3\sqrt{3}}{8} A^2 \ (\mu m^2)$$

and a pore surface area Sp of:

$$S_p = \frac{\pi}{4} a^2 \ (\mu m^2).$$

Therefore, an area proportion Cp held by pores is:

$$C_p = \frac{2\pi}{3\sqrt{3}} \left(\frac{a}{A}\right)^2.$$

Therefore, when the barrier layer 5 is disregarded, an ink reception height Ra (µm) per unit area is:

$$R_a = L * C_p = \frac{2\pi}{3\sqrt{3}} \left(\frac{a}{A}\right)^2 L \ (\mu m).$$

Here, when the volume of ink droplets to be shot in is represented by Vd (µm³) and the shot-in area by Sd (µm²), the height h (µm) per unit area, of the ink droplets having been shot in, is:

$$h = Vd/Sd$$

Here, also when the volume percentage held by non-volatile components in the ink (mixing ratio) is represented by X, a non-volatile component height t (µm) is:

$$t = X \ Vd/Sd \ (\mu m).$$

It is important for the height t not to exceed the ink reception height Ra set forth above. If $t \leq Ra$ is not satisfied, the ink may exude to cause a deterioration of image quality as previously stated. Therefore, it is important to select the mixing ratio X and the layer thickness L so that;

$$X \ Vd/Sd \leq \frac{2\pi}{3\sqrt{3}} \left(\frac{a}{A}\right)^2 L,$$

that is;

$$X \ Vd/Sd \leq 1.21 \left(\frac{a}{A}\right)^2 L$$

is satisfied. Also, since in general the Vd/Sd is 10 µm and the a/A of the aluminum anodic oxide layer is 0.25 in ink-jet recording, it usually follows that;

$$X \leq 0.0076L^*$$

wherein L* is a dimensionless number.

An example of the production apparatus employing the above ink-jet recording of the present invention will be described below.

Figure 7:
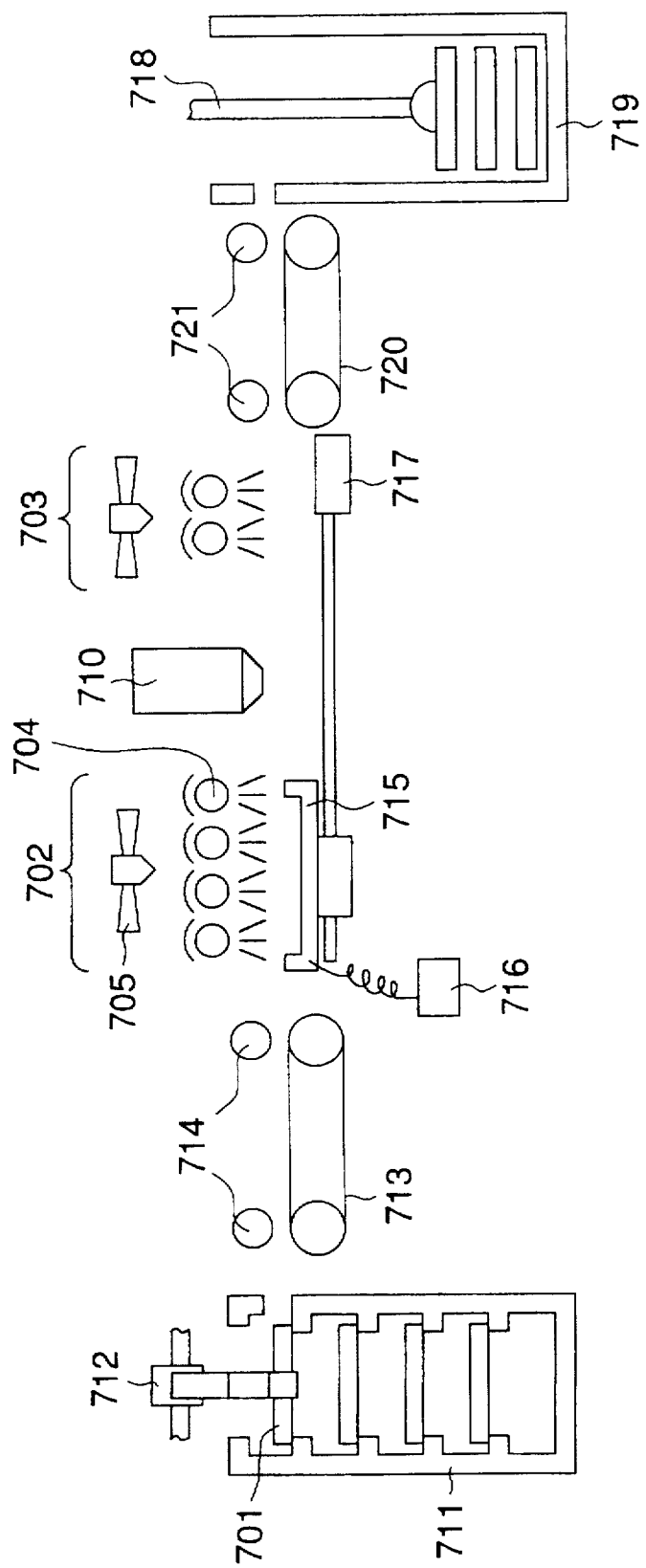
FIG. 7 diagrammatically illustrates the main part of an example of the ink-jet recording apparatus of the present invention.

FIG. 7 diagrammatically illustrates the whole production apparatus. In FIG. 7, reference numeral 710 denotes a recording head, which is an ink-jet recording head with 128 nozzles of 400 dpi, having an ejection quantity of 25 ng per dot. The apparatus is provided with four recording heads corresponding to four colors of Y (yellow), M (magenta), C (cyan) and Bk (black) and is so set up that a full color image can be recorded at one scan. Reference numeral 701 denotes a recording medium comprising, as previously described, a plate, sheet or foil made of aluminum or an alloy thereof on the surface of which the anodic oxide layer has been formed to serve as the image forming surface. A plurality of recording mediums 701 are set in a stocker 711, which are successively sent to a belt conveyor by means of a transporter 712 and fed forward to a printing tray 715. Reference numeral 714 denotes an auxiliary roller for transport.

The recording medium 701 fed to the printing tray 715 is firmly secured by suction onto the tray by the operation of a suction pump 716. The recording medium 701 on the tray 715 is sent to a zone where the first treatment step (the step of dehydration and activation) is carried out, and is heated by irradiation with infrared rays from infrared lamps 704, so that the water content present in the anodic oxide layer of the recording medium 701 is removed and also dehydration reaction take place to activate the layer. A fan 705 is also rotated to ventilate the zone, whereby the treatment at the first step can be made more effective.

The recording medium 701 is sent out by the operation of a feed motor 717 from the zone of the first treatment step, and immediately thereafter the recording head 710 carries out ink-jet recording. In this second step ink-jet recording, various ink-jet recording systems such as a piezoelectric type and an electrostatic type can be used. A bubble-jet recording system is preferred since it can stably carry out high-speed recording.

As for the recording process, two-pass or four-pass printing may be employed if the problem of bleeding or the like occurs when one-pass printing is employed. As inks used here, those having various composition can be used. As previously stated, those in which the types of dyes and the content of non-volatile solvents have been suited for use in anodic oxide layers may preferably be used under appropriate selection. The recording medium 701 on which an image has been recorded is immediately transported to a zone in which the third step treatment is applied. This step is taken in order to evaporate and send off the volatile components of inks present in the anodic oxide layer on which an image has been formed, and also allow the dyes in inks to react with the layer to promote dyeing so that the image can be firmly fixed. In this apparatus, this third step is carried out by a heating means 703 having a fan and infrared lamps in combination. What is intended in the third step is to fix the dye in the inks on the layer. It is also a process preferable for fixing dyes that the water and oxygen in the air react with the anodic oxide layer to form a hydroxide to seal pores in the layer. Hence, different from the first step, it is not always necessary to operate the fan.

The recording medium 701 (an image-recorded product) having been subjected to the above three steps is transported to a stocker 719 via a conveyor 720 and a feed roller 721, and received at a given position by a handler 718.

Figure 8:
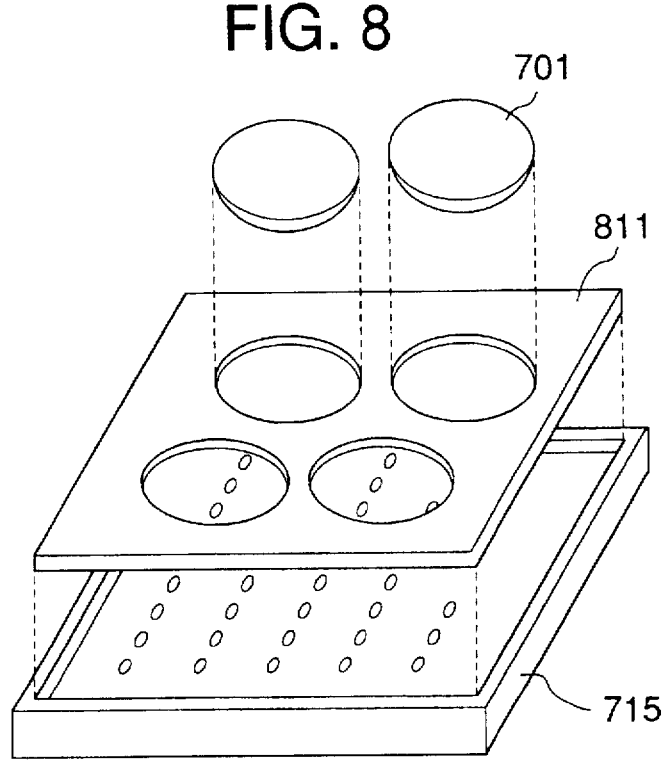
FIG. 8 illustrates an example of the construction of a tray used in the ink-jet recording apparatus of the present invention.

In the example shown in the drawing, the recording medium 701 has the shape of a rectangular sheet. The tray 715 on which it is transported is appropriately adjusted so as to be conformable to the form of the recording medium. For example, a spacer 811 as shown in FIG. 8 may be used so that the tray can be adapted to the recording on a disk type recording medium. This apparatus may also preferably have a means for adjusting the distance between the recording head and the image forming surface of the recording medium in accordance with the thickness of the recording medium.

In order to promote the effect of the heating in the first step and the third step, the tray may be auxiliarily provided with a heating means such as a heater so that, for example, the recording medium is preheated before each treatment. This improves heating efficiency also when a relatively large-sized recording medium with a large heat capacity is treated, and enables effective treatment.

Figure 9:
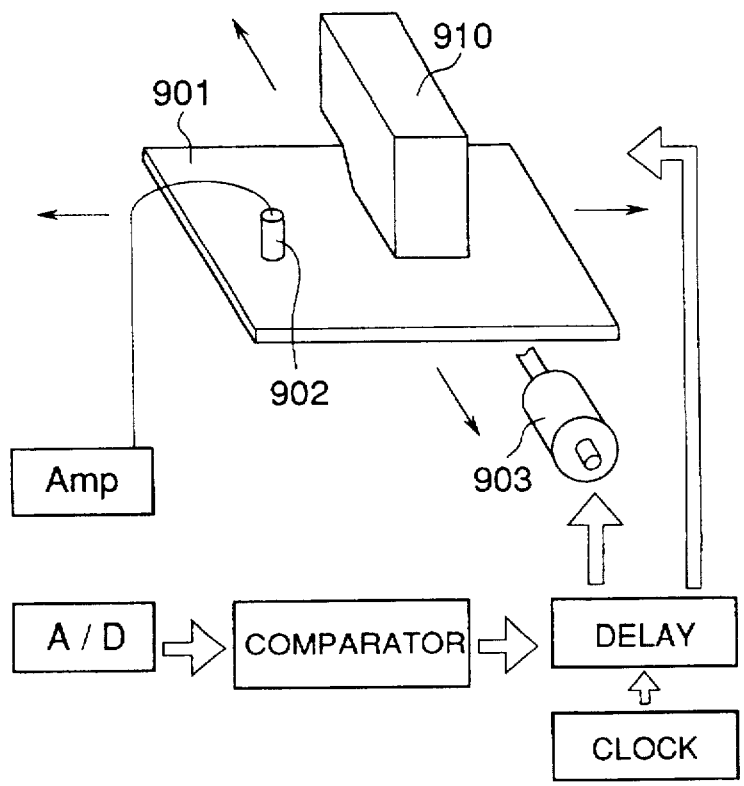
FIG. 9 illustrates an example of a position correcting system operable in accordance with the temperature of the image forming surface of a recording medium when the recording medium and a recording head are positionally registered in the ink-jet recording apparatus of the present invention.

When the recording medium is heated, any dimensional distortion may occur because of thermal expansion to cause a deviation in the width direction of recording and the feed direction, bringing about the problems of white stripes appearing on recorded images and deviation of print size. In such a case, it is preferable to use, for example, as shown in FIG. 9, a system in which the surface temperature of the image forming surface of a recording medium 901 is detected by a temperature sensor 902, the detected values are amplified by an amplifier (Amp), the amplified values are digitized using an A/D converter (A/D) to compare the digitized value with a preset value by means of a comparator and then the signals obtained are sent to a recording head 910 and a motor 903 in the form of optimum delay signals with respect to clock signals to make control so that the recording medium can be correctly positioned.

As previously stated, in the anodic oxide layer of aluminum or an alloy thereof, the ink reception quantity is greatly influenced by the sealing percentage of the pores constituting the layer, the layer thickness, the pore size, the cell density and so forth. However, these properties of the layer may become non-uniform among a plurality of recording mediums formed under the same conditions, and may cause a non-uniformity in image quality, in particular, a non-uniformity in image quality between lots when the recording is carried out in the second step under the same conditions. In such a case, the problem can be solved by adding a control means for adjusting the ejection quantity by controlling recording head pulse width, head temperature, time between full pulses and so forth, on the basis of a feedback of the results obtained by previously printing characters on the anodic oxide layer at its part on which no images will be recorded and pre-examining their print density, balance of shade between colors and so forth.

In order for the recording medium to be transported in a good precision, a mark may be made at a non-print area of the recording medium by etching or pressing so that its position can be read by a suitable reading means to always make sure the position of the recording medium and control the transport means in accordance with the position, whereby the recording medium can be transported in a good precision. When the recording medium has a warp, it is effective to add to the roller or the like a function to correct the warp. If the above mark may damage the commercial value of products, it may be removed by means of a shearing press or the like after printing.

A member having the part comprised of aluminum or an alloy thereof on which the image has been formed in this way may be used as it is without sealing of the whole pores if it is used, for example, for interiors. If it is used for exteriors where a reliability is required, the sealing of pores may preferably be additionally made to form a product.

Next, examples of the mechanism in the second step ink-jet recording used in the process and apparatus of the present invention will be described below in detail.

In the ink-jet recording on the aluminum anodic oxide layer, as previously stated, the aluminum anodic oxide layer itself has no ink permeability and also the pores serving as an ink receptor have not so large volume. Moreover, there is a limit to increasing the evaporation of inks. Hence, especially in the case of a recording process where multi-color inks are simultaneously shot in plurality, the above process alone may be unsatisfactory in image quality.

Accordingly, the recording is not carried out all at one time using nozzles arranged in plurality, but recording scans are divided into several times and the recording is reciprocally carried out. Use of such a system in combination makes it possible to obtain high-quality images. Namely, this is a system in which, when recording is carried out by scanning n-times, nozzles are arranged in plurality (m-nozzles) and a printing face is forwarded by m/n, where the printing is repeated to form picture element units of n×a, and n×a picture elements are filled by scanning divided into n-times. This makes it possible to eliminate uneveness in recording scans, to gain time until inks are dyed and fixed, and to keep a drying time for which ink reception at pores can be completed.

Figure 10:
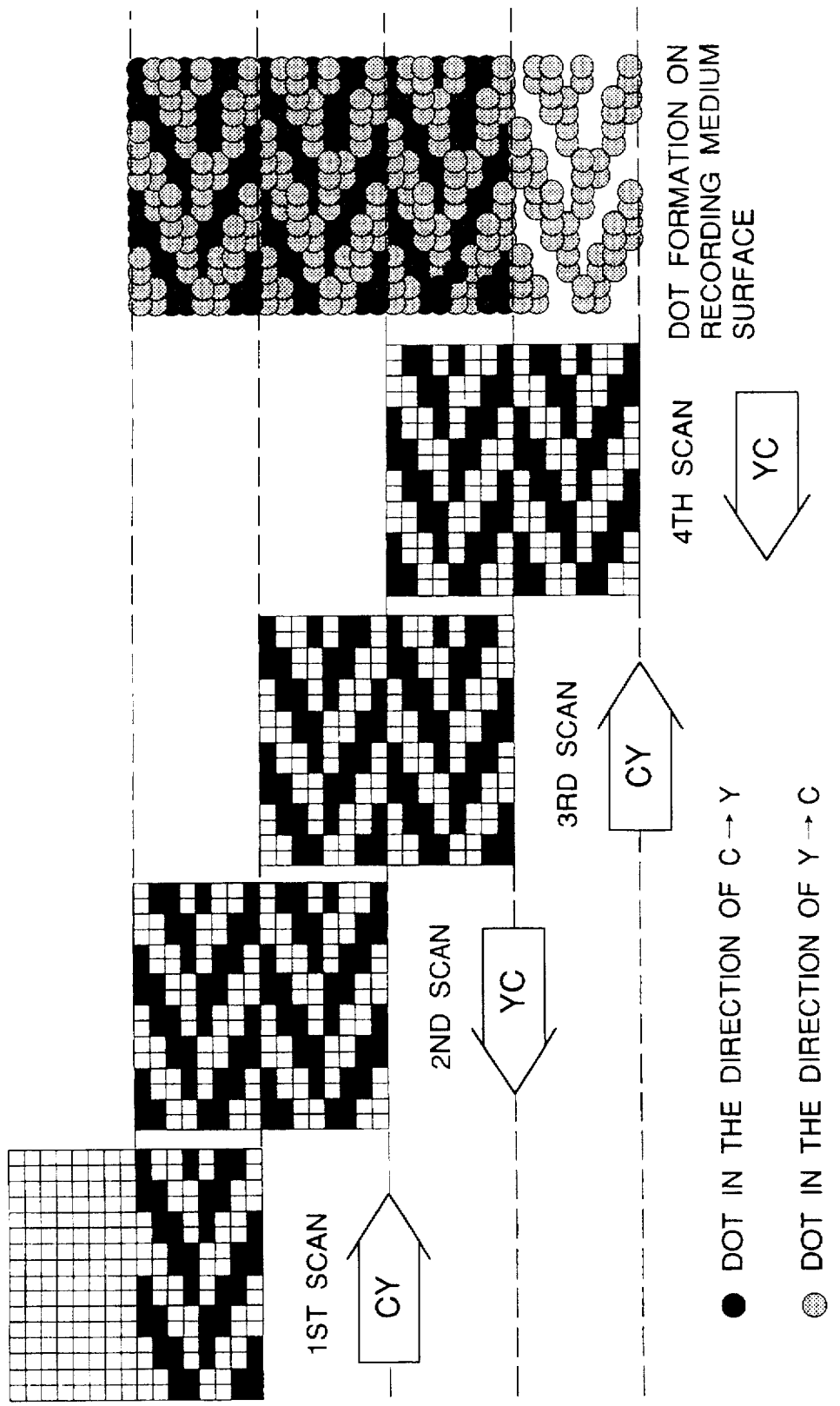
FIG. 10 illustrates a specific example of the formation of dots on a recording medium in the ink-jet recording of the present invention.

FIG. 10 illustrates a specific example of the formation of dots on the recording medium of the present invention. FIG. 10 shows a state in which C-ink and Y-ink are simultaneously shot to form dots. Squares shown in the first scan represent the position of the recording head and the scope in which inks can be shot in at the scan. The squares painted out in black are areas in which recording signals have been actually given to make a record, and the apparatus is so set as for a lower ½ part of the head to give a half shot-in quantity. Next, at the second scan, paper is forwarded by ½ of the nozzle width of the head to make a record at the remaining area in which no record has been made at the first scan, using the upper half of the recording head. Recording is carried out also at the lower half in a like pattern to make a record leaving a ½ area unrecorded. This is a process in which the recording is further repeated for the third scan and the fourth scan to form a 100% image-recorded area. Here, such a recording process is called the "two-pass printing".

This two-pass printing can eliminate the uneveness for each scan. Since, however, two color inks are simultaneously shot in as shown in FIG. 10, the reception quantity of the aluminum anodic oxide layer is required to be doubled. This is unsuitable for those having a thin aluminum anodic oxide layer as previously stated. Accordingly, in the case when the multi-color printing is carried out and in the recording process in which inks are simultaneously shot in at the same position, it is necessary to change the pattern for each color to make a record so that each color ink is shot in at a different position for each pass.

Figure 13:
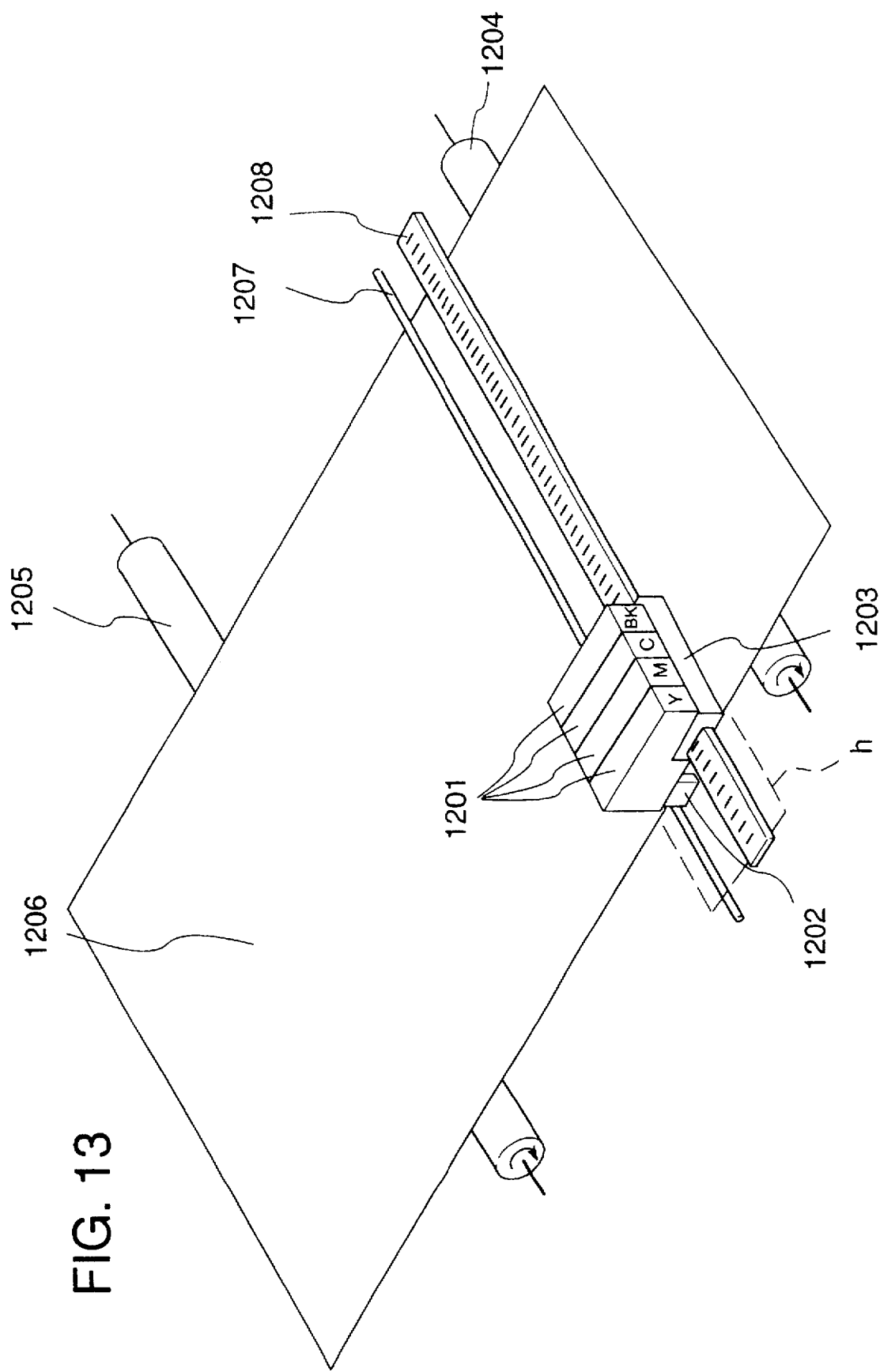
FIG. 13 perspectively illustrates an example of an apparatus for carrying out the ink-jet color recording of the present invention.

FIGS. 11A to 11H and 12A to 12H illustrate specific examples in which patterns are changed for each color to make a record. In the examples shown in FIGS. 11A to 11H and 12A to 12H, Y, M, C and Bk four color inks are used and recording is carried out using a recording apparatus as shown in FIG. 13, in which four heads each having 64 nozzles are arranged in parallel. In FIG. 13, reference numeral 1201 denotes recording heads corresponding to four colors; 1202, an ejection orifice; 1203, a carriage; 1204 and 1205, aluminum sheet feed rollers; 1206, an aluminum sheet having an aluminum anodic oxide layer on its surface; 1207, a rail; and 1208, an encoder.

As shown in FIGS. 11A to 11H and 12A to 12H, when four-color recording is carried out, 4×4 picture elements are arranged so that the four colors do not overlap one another, and recording signals are selected for each color so that inks are shot in one pass for four dots among them. FIGS. 11A to 11H and 12A to 12H show 16 picture elements in the nozzle array direction and 16 picture elements in the scan direction, and the apparatus is so set as to form a 100% image-recorded area upon scanning repeatedly carried out four times. Similar to the example previously described, the squares painted out in black are areas in which inks are shot. The aluminum sheet is forwarded with respect to the heads by 16 nozzles each as a second pass, a third pass and a fourth path toward the right side to carry out recording. Thus, inks are not simultaneously shot in for each color, ink droplets are received in pores within the time the respective scans are repeated and no bleeding may occur between colors, so that it becomes possible to form high-quality color images. This recording process is herein called "color-by-color pass printing".

Table 1 shows how the respective printing systems are effective on image quality. Criterions of judgement on image quality for each system are shown together. "One passe" indicates the recording carried out by 100% shot-in at usual one scan; "Two passes", the recording process described above with reference to FIG. 10; and "Four passes", the recording process described above with reference to FIGS. 11A to 11H and 12A to 12H. "Monochrome" indicates an instance where the recording is carried out in Bk monochrome; and "Full color", the recording process in which simultaneous recording is carried out using Y, M, C and Bk four color inks under three-color overlap at most.

As will be seen from Table 1, in the case of the monochrome, the scanning line irregularity and the bleeding on the recording surface are reasonably prevented so long as the recording is divided into at least two passes, and there is no problem in practical use. In the case of the full-color printing, high-quality images can be achieved by four-pass printing where passes are separated for each color.

TABLE 1

|  | Monochrome | Full color |
| --- | --- | --- |
| One pass: | B | B |
| Two passes: | A | B |
| Four passes: | AA | AA |

AA: No bleeding occurs at all and images have a good quality.
A: Bleeding slightly occurs but images are at a level not problematic in pratcial use.
B: Bleeding occurs in areas where at least two colors are superosed.
C: Bleeding greatly occurs and images have a very poor quality.

A printing system employing an image forming process according to another embodiment of the present invention will be described below.

Figure 14A:
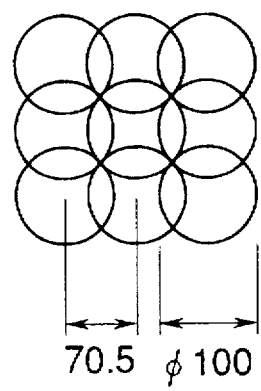
FIGS. 14A and 14B illustrate an ideal state of image formation on a recording medium.
Figure 14B:
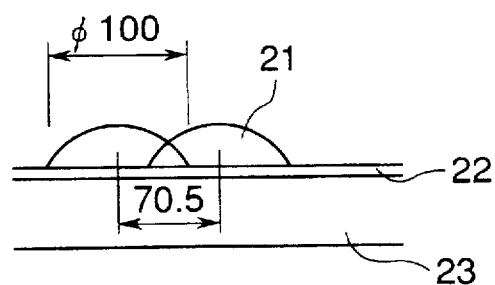

In order to increase recording density, it is necessary to decrease, on the recording surface, areas on which dyes are not fixed. For example, as shown in FIGS. 14A and 14B, it is suitable for ink droplets to each have a diameter of about 100 μm under recording conditions of 360 dpi. Since the distance between the centers of ink droplets comes to be 70.5 μm, ink droplets 21 form dots in such a way that they overlap with each other on an anodic oxide layer 22 formed on an aluminum base 23. FIG. 14A is a top view of droplets in FIG. 14B.

Figure 15A:
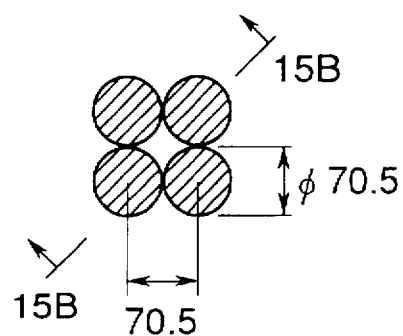
FIGS. 15A and 15B illustrate an improper state of image formation on a recording medium.
Figure 15B:
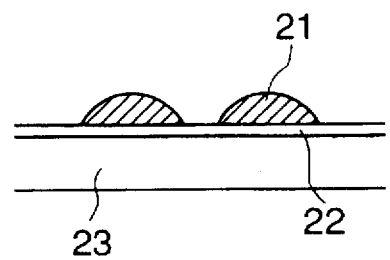

In contrast, if, for example, images are recorded at 360 dpi in an ink droplet diameter of 70.5 μm, areas having no dyes remain on the surface as shown in FIGS. 15A and 15B. FIG. 15B is a cross section along the line 15B—15B in FIG. 15A.

When such areas having no dyes remain, no sufficient density can be achieved no matter how high the dye density at each dot is made.

Thus, it follows that dots are so formed as to be in the relationship as shown in FIGS. 14A and 14B.

However, the anodic oxide layer 22, which is different from paper or recording mediums made up to have an absorptive base material, has no ink permeability, and hence, when a plurality of dots are formed in the state of the ink droplets as shown in FIGS. 14A and 14B, the ink having impacted on the surface acts in such a way that the ink droplets come together because of surface tension inherent in the ink.

Figure 16A:
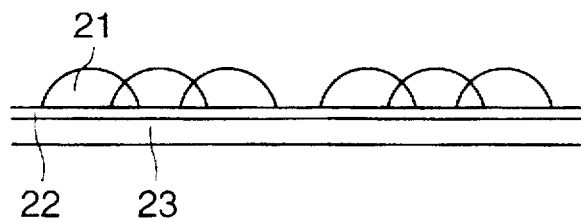
FIGS. 16A to 16G illustrate how dots come together after their impact onto a recording medium.
Figure 16E:
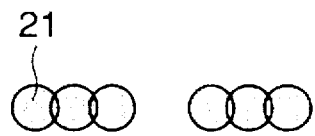
Figure 16B:
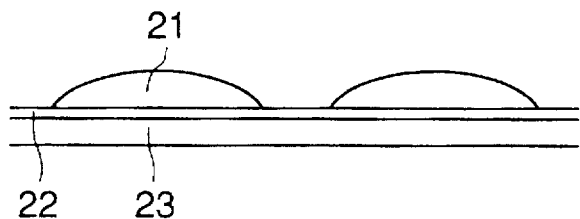

More specifically, ink droplets standing as shown in FIG. 16A turn into a state as shown in FIG. 16B.

Figure 16F:
Figure 16C:
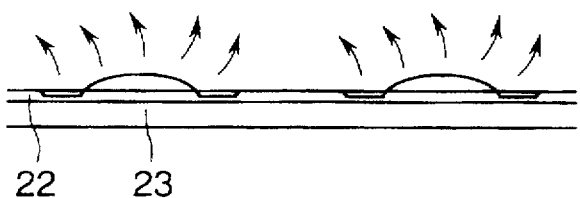
Figure 16G:
Figure 16D:

As evaporation of volatile solvents takes place from this state, an ink having increased in dye concentration is left on the surface, and this ink also comes toward the center because of surface tension (FIG. 16C and 16G). With a further progress of this course of action, an image having a dye in a large quantity at the center and in a gradually smaller quantity toward the outside is formed, as shown in FIG. 16D. Also, in some cases, non-volatile solvents may remain at the center in a concentrated state.

In the case of monochromes, this brings about an uneven density to lower the quality level of images. In the case of color images, this may cause bleeding of inks with different colors adjacently formed.

FIGS. 16E and 16F show shapes of ink droplets 21 on the surface of anodic oxide layer 22 of FIGS. 16A and 16B, respectively, viewed from the top.

Figure 17A:
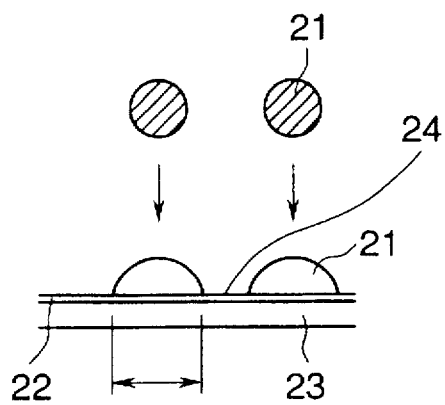
FIGS. 17A and 17D illustrate how dots run over after their impact onto a recording medium.
Figure 17C:
Figure 17B:
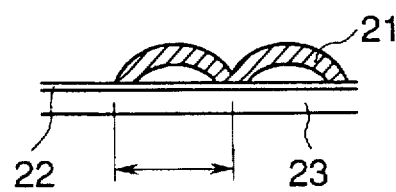

In instances in which ink droplets are superimposingly shot, the volume of ink droplets increases as shown in FIGS. 17A and 17B, to cause ink run-over, so that even dye-free areas 24 (FIG. 17A) are colored as shown in FIG. 17B.

Figure 17D:

FIGS. 17C and 17D show shapes of ink droplets 21 on the surface of anodic oxide layer 22 of FIGS. 17A and 17B, respectively, viewed from the top.

Figure 18A:
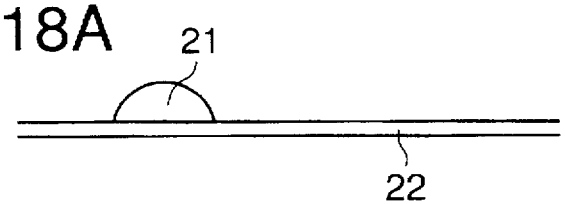
FIGS. 18A to 18L illustrate a manner by which an image is formed on a recording medium according to the present invention.
Figure 18B:
Figure 18C:
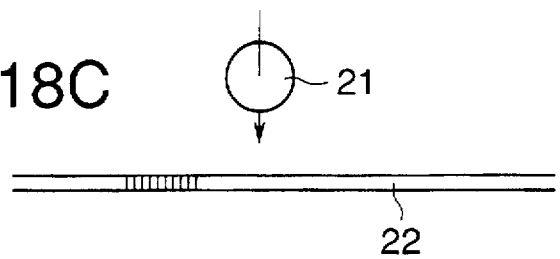
Figure 18D:
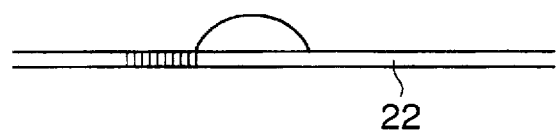
Figure 18E:
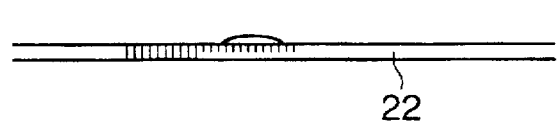
Figure 18F:
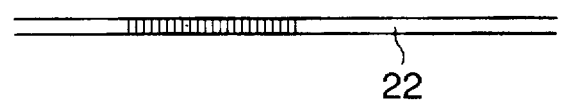
Figure 18G:
Figure 18H:
Figure 18I:
Figure 18J:
Figure 18K:
Figure 18L:
Figure 19A:
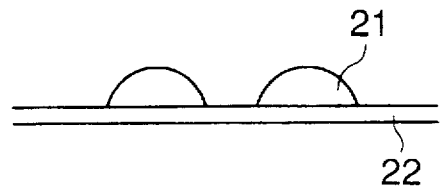
FIGS. 19A to 19F also illustrate a manner by which an image is formed on a recording medium according to the present invention.
Figure 19B:
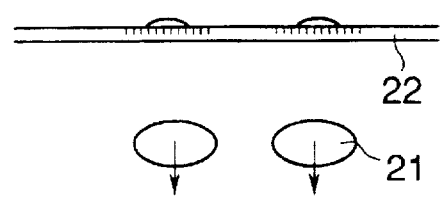
Figure 19C:
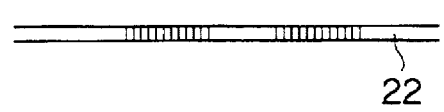
Figure 19D:
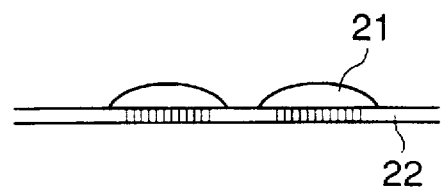
Figure 19E:
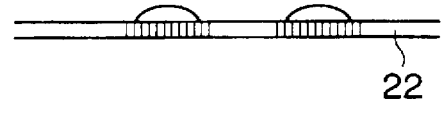
Figure 19F:
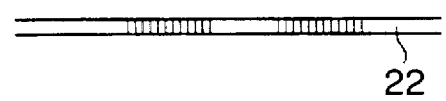

Now, in the present invention, as shown in FIGS. 18A to 18F and FIGS. 19A to 19F, after volatile solvents of ink droplets having impacted first have substantially evaporated (FIGS. 18A to 18C), the next ink droplets are made to impact (FIGS. 18A to 18C). Thus, neither uneven density nor bleeding as stated above may occur.

FIGS. 18G through 18L show shapes of dots and ink droplets on the surface of anodic oxide layer of FIGS. 18A through 18F, respectively, viewd form the top.

Figure 20:
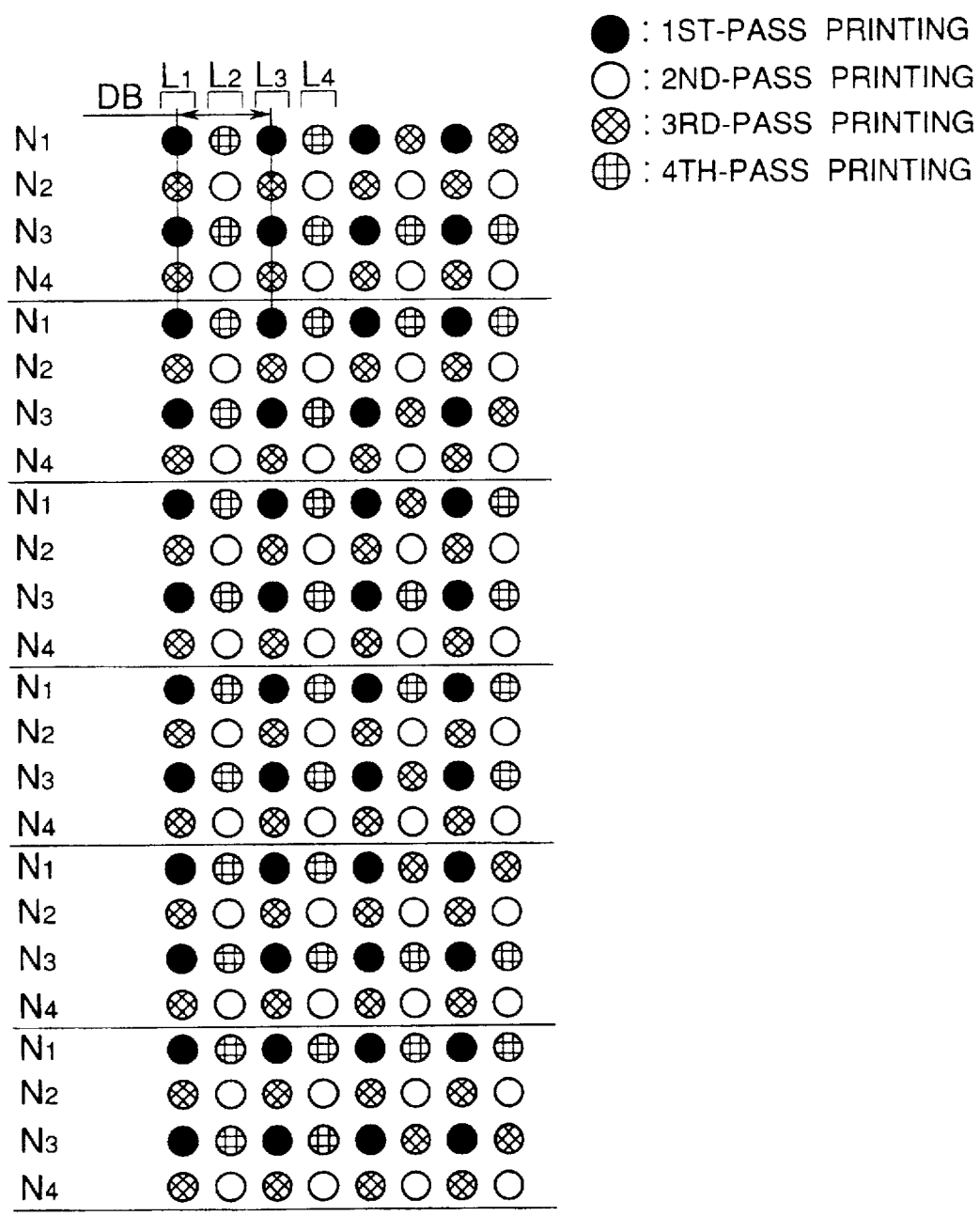
FIG. 20 illustrates a dot-interval drive according to the present invention.

This can be accomplished by recording dot-interval images several times as shown in FIG. 20.

More specifically, at first-pass printing, nozzles N1 and N3 are simultaneously driven to print odd-numbered lines; at second-pass printing, nozzles N2 and N4 are simultaneously driven to print even-numbered lines; at third-pass printing, nozzles N2 and N4 are simultaneously driven to print odd-numbered lines; and at fourth-pass printing, nozzles N1 and N3 are simultaneously driven to print even-numbered lines.

Thus, dots in the same pass become distant by two dots (DB in the drawing) and hence it becomes possible to prevent any bleeding caused by dots in the same pass and between passes.

In the case of color images, this procedure may be similarly repeated so that a first color is fixed and thereafter the next color is fixed.

In this case, in order to prevent misregistration between colors, multi-color registration may be carried out by a mechanical means or electrical means known in the art.

EXAMPLES

The present invention will be described below in greater detail by giving Examples.

Example 1

On the surfaces of A4 size aluminum sheets (sheet thickness: 0.5 mm) on which aluminum anodic oxide layers of about 10 μm thick each had been formed, images were formed along the steps according to the process of the present invention, using the recording apparatus as previously described and also using inks.

In the first step and the third step, heating and drying were employed, and were carried out under conditions as shown in Table 2 below, i.e. appropriate combination with no heating, heating at 40° C. or heating at 60° C. Image quality was evaluated on the recorded images obtained. Criterions and results of the evaluation are shown together in Table 2. As is seen from the results shown in Table 2, good images can be finally obtained when the heating at 60° C. is applied in the first treatment step and the heating at 40° C. or above is applied in the third treatment step. As is also seen therefrom, no good images can be formed even though the third treatment steps are carried out under any conditions, when the first treatment step is omitted.

TABLE 2

|  | Third step | | |
|---|---|---|---|
|  | No heating | 40° C. | 60° C. |
| First step |  |  |  |
| No heating: | C | C | C |
| 40° C.: | C | B | A |
| 60° C.: | B | AA | AA |

AA: No bleeding occurs at all and images have a good quality.
A: Bleeding slightly occurs but images are at a level not problematic in practical use.
B: Bleeding occurs in areas where at least two colors are superposed.
C: Bleeding greatly occurs and images have a very poor quality.

Example 2

Influences of the solvent proportion of non-volatile component in ink when the ink-jet recording was carried out on the aluminum anodic oxide layer according to the present invention were examined using glycerol as the solvent, to make evaluation as reported below.

Using 100 g of ink solutions prepared by mixing 3 g of a dye, glycerol in the amount as shown in Table 3 below and the balance of water and IPA in a ratio of 10:1, bubble-jet type ink-jet recording was carried out along the steps according to the process of the present invention, on aluminum sheets (A) on which anodic oxide layers (aluminum anodic oxide layers) with a layer thickness of 10 μm each had been formed and aluminum sheets (B) on which anodic oxide layers (aluminum anodic oxide layers) with a layer thickness of 20 μm each had been formed.

Image quality was evaluated on the recorded images obtained. Criterions of the evaluation are the same as those in Example 1. Results obtained are shown together in Table 3. As is seen from the results shown in Table 3, in the case of the aluminum sheet having an aluminum anodic oxide layer with a layer thickness of 10 μm, a good image quality is attained when the glycerol is in a percentage of 5% or less. In the case of the aluminum sheet having an aluminum anodic oxide layer with a layer thickness of 20 μm, a better image quality is attained when the glycerol is in a percentage of 10% or less.

TABLE 3

| Amount of glycerol (g) | A 10 μm thick layer | B 20 μm thick layer |
|---|---|---|
| 1 | AA | AA |
| 3 | AA | AA |
| 5 | A | AA |
| 10 | — | A |

Example 3

On aluminum sheets with a sheet thickness of 0.5 mm on which aluminum anodic oxide layers of about 20 μm thick each had been formed, which were subjected to dehydration and activation treatments, images were formed by bubble jet recording, using an ink composed of the following.

| C.I. Direct Black 168 | 3% by weight |
|---|---|
| Ethylene glycol | 10% by weight |
| Isopropyl alcohol | 5% by weight |
| Water | 82% by weight. |

Next, the aluminum sheets on which images were thus formed were washed with an aqueous 10% by weight $AlCl_3$ solution for 3 minutes, followed by further washing with water for 5 minutes.

Samples thus washed and samples not having been washed were tested for their 50 hour light-fastness by the use of a fade-O-meter (ATLAS Ci35).

Evaluation was made using a reflection densitometer (MACBETH R-D915), where reflection densities were measured before the light-fastness test and after the light-fastness test to compare the retensions.

$$\text{Retension} = \frac{\text{Reflection density after light-fastness test}}{\text{Reflection density before light-fastness test}} \times 100$$

Results obtained are shown in Table 4.

The washing with an aqueous polyvalent metal salt solution is seen to bring about an improvement in light-fastness.

TABLE 4

|  | Washed | Not washed |
|---|---|---|
| Retension of reflection density: | 80% or more | Less than 80% |

Example 4

On 0.5 mm thick aluminum sheets on which aluminum anodic oxide layers of 20 μm thick each had been formed, images were formed by bubble jet recording as in Example 3, using the same ink as used in Example 3.

Next, samples were prepared, some of which were subjected to sealing of pores of anodic oxide layers by the use of an aqueous 1% by weight $AlCl_3$ solution, and some of which were not.

Evaluation was made in the same manner as in Example 3.

Results obtained are shown in Table 5.

The sealing of anodic oxide layers by the use of an aqueous polyvalent metal salt solution is seen to bring about an improvement in light-fastness.

TABLE 5

| | Sealed | Not sealed |
|---|---|---|
| Retension of reflection density: | 85% or more | Less than 80% |

As described above, according to the image forming process of the present invention, the reactivity with dyes and the ink reception quantity are improved when the anodic oxide layer formed on the surface of a plate, sheet or foil of aluminum or an alloy thereof is subjected to the dehydration and activation treatments before the ink droplets are imparted thereto. Also, recorded images having a superior image performance can be finally formed on the anodic oxide layer when, after the ink droplets have been imparted, the volatile components in inks mixedly present in the layer are evaporated to fix the dyes (coloring matter) in the inks on the layer to thereby improve ink fixing performance.

According to the apparatus of the present invention, recorded images having a superior image performance can be finally formed on the anodic oxide layer provided on the surface of a plate, sheet or foil of aluminum or an alloy thereof, according to the process as described above.

The decorative aluminum plate, sheet or foil of the present invention has been treated and processed in the manner as described above, before the recorded images are formed, i.e., before inks are imparted to the anodic oxide layer provided on the surface of a plate, sheet or foil of aluminum or an alloy thereof, and hence has a superior image performance.

According to the present invention, images and decorative aluminum sheets having a superior light-fastness can be formed when, after recorded images have been formed, the aqueous polyvalent metal salt solution is applied to the anodic oxide layer formed on the surface of a plate, sheet or foil of aluminum or an alloy thereof.

According to the present invention, the coloring ability of ink can be improved when the anodic oxide layer formed on the surface of a plate, sheet or foil of aluminum or an alloy thereof is subjected to the dehydration and activation treatments before the ink droplets are imparted thereto. Also, in the recording carried out plural times by imparting ink droplets so as to form dot-interval images, in the case when the next ink droplets are imparted adjacently to the ink droplets first imparted, the next ink droplets are imparted to the adjacent areas after the ink at least in the areas where they are superimposed on the ink droplets first imparted has been substantially fixed and the dye in the ink has been also fixed. In the case when the next ink droplets are imparted superimposingly to the ink droplets first imparted, the next ink droplets are superimposed after the ink droplets first imparted has been substantially fixed and the dye in the ink has been also fixed. This makes it possible to form images free of ink bleeding and to finally form recorded images having a superior image performance on the anodic oxide layer, and decorative aluminum sheets having such recorded images.

What is claimed is:

1. An image forming process for forming an image on an anodic oxide layer formed on the surface of a plate, sheet or foil made of aluminum or an aluminum alloy, using an ink-jet printing process with an ink containing a dye and a volatile component, comprising the steps of:

dehydrating and activating the anodic oxide layer;

imparting ink to the anodic oxide layer by performing dot-interval printing by scanning a printing head plural times; and removing a volatile component contained in the ink from the anodic oxide layer to fix the dye contained in the ink into the anodic oxide layer.

2. The image forming process according to claim 1, wherein during the ink-imparting step said dot-interval printing is performed in such a manner that the dots printed in one dot-interval printing do not become continuous on the anodic oxide layer.

3. The image forming process according to claim 1, wherein during the ink-imparting step, ink droplets from a second scan of the printing head are imparted adjacently to ink droplets from a first scan of the printing head after the volatile component in the ink droplets from the first scan has evaporated.

4. The image forming process according to claim 1, wherein during the ink-imparting step ink droplets from a second scan of the printing head are superimposed on ink droplets from a first scan of the printing head after the volatile component in the ink droplets from the first scan has evaporated.

5. The image forming process according to claim 1, wherein said ink comprises multi-color inks to form a multi-colored printed image.

6. The image forming process according to claim 1, wherein each treatment in at least one of the dehydrating and activating step and the volatile component-removing step is a heat treatment.

7. The image forming process according to claim 1, wherein each treatment in at least one of the dehydrating and activating step and the volatile component-removing step is an electromagnetic induction treatment.

8. The image forming process according to claim 1, wherein each treatment in at least one of the dehydrating and activating step and the volatile component-removing step is a dry-air blowing treatment.

9. The image forming process according to claim 1, further comprising a fourth step of sealing pores in the anodic oxide layer after fixing the dye into the anodic oxide layer.

10. The image forming process according to claim 1, wherein said ink-jet printing process is a bubble-jet printing process.

11. The image forming process according to claim 1, further comprising a step of applying an aqueous polyvalent metal salt solution to the anodic oxide layer after ink has been imparted in said imparting step.

12. The image forming process according to claim 1, wherein the anodic oxide layer has a thickness of from 5 to 25 μm.

13. The image forming process according to claim 1, wherein the ink further comprises a non-volatile component and an amount per unit area of the non-volatile component imparted to the anodic oxide layer is not more than an ink reception quantity per unit area of pores in the anodic oxide layer.

14. A process for producing a decorative aluminum plate, sheet or foil having an image printed on an anodic oxide layer formed on the surface of a plate, sheet or foil made of aluminum or an aluminum alloy, using an ink-jet printing process, comprising the steps of:

dehydrating and activating the anodic oxide layer;

imparting ink to the anodic oxide layer by performing dot-interval printing by scanning a printing head plural times; and removing a volatile component contained in the ink from the anodic oxide layer to fix a dye contained in the ink into the anodic oxide layer.

15. The process for producing a decorative aluminum plate, sheet or foil according to claim 13, wherein, during the ink-imparting step, ink is imparted during a second scan of the printing head adjacent to ink imparted during a first scan of the printing, head after a volatile component in the ink from the first scan has evaporated.

16. The process for producing a decorative aluminum plate, sheet or foil according to claim 13, wherein, during the ink-imparting step, ink is imparted during a second scan of the printing head superimposed on ink imparted during a first scan of the printing head after the volatile component in the ink from the first scan has evaporated.

17. The process for producing a decorative aluminum plate, sheet or foil according to claim 14, wherein the ink comprises a plurality of colored inks to form a multi-colored printed image.

18. The process for producing a decorative aluminum plate, sheet or foil according to claim 14, wherein at least one of the dehydrating and activating step and the volatile component-removing step includes treating the anodic oxide layer with heat.

19. The process for producing a decorative aluminum plate, sheet or foil according to claim 14, wherein at least one of the dehydrating and activating step and the volatile component-removing step includes treating the anodic oxide layer by electromagnetic induction.

20. The process for producing a decorative aluminum plate, sheet or foil according to claim 14, wherein at least one of the dehydrating and activating step and the volatile component-removing step includes a step of blowing dry-air across the anodic oxide layer.

21. The process for producing a decorative aluminum plate, sheet or foil according to claim 13, further comprising a fourth step or sealing pores in the anodic oxide layer after fixing the dye into the anodic oxide layer.

22. The process for producing a decorative aluminum plate, sheet or foil according to claim 14, wherein the ink-jet printing process is a bubble-jet printing process.

23. The process According to claim 13, further comprising a step of applying an aqueous polyvalent metal salt solution to the anodic oxide layer after ink has been imparted in said imparting step.

24. The process according to claim 13, wherein the anodic oxide layer has a thickness of from 5 to 25 μm.

25. The process for producing a decorative aluminum plate, sheet or foil according to claim 14, wherein, during the ink-imparting step, the dot-interval printing is performed such that the dots printed in one dot-interval printing are not continuous on the anodic oxide layer.

26. The process for producing a decorative aluminum plate, sheet or foil according to claim 14, wherein the ink further comprises a non-volatile component and an amount per unit area of the non-volatile component imparted to the anodic oxide layer is not more than an ink reception quantity per unit area of pores in the anodic oxide layer.

27. An image forming process for forming an image on an anodic oxide layer formed on the surface of a plate, sheet or foil made of aluminum or an aluminum alloy, using an ink-jet printing process with an ink containing a dye and a volatile component, comprising the steps of:

heating the anodic oxide layer to dehydrate and activate the anodic oxide layer;

imparting ink to the anodic oxide layer having been subjected to heat treatment in said heating step; and heating the anodic oxide layer immediately after the imparting of ink in said imparting step to remove the volatile component from the imparted ink and fix the dye into the anodic oxide layer.

28. The image forming process according to claim 25, wherein the anodic oxide layer has a thickness of from 5 to 25 μm.

29. The image forming process according to claim 27, wherein the ink-jet printing process is a bubble-jet printing process.

30. The image forming process according to claim 25, wherein the volatile component of the ink has an evaporation rate of from $1.0 \times 10^{-5}$ g/mm$^2$·sec to $1.0 \times 10^{-7}$ g/mm$^2$·sec.

31. The image forming process according to claim 25, further comprising a step of applying an aqueous polyvalent metal salt solution to the anodic oxide layer after ink has been imparted in said imparting step.

32. The image forming process according to claim 25, further comprising a step of sealing pores in the anodic oxide layer after fixing the dye into the anodic oxide layer.

33. The image forming process according to claim 25, wherein the ink comprises multi-color inks to form a multi-colored printed image.

34. The image forming process according to claim 27, wherein the ink further comprises a non-volatile component and an amount per unit area of the non-volatile component imparted to the anodic oxide layer is not more than an ink reception quantity per unit area of pores in the anodic oxide layer.

35. A process for producing a decorative aluminum plate, sheet or foil having an image printed on an anodic oxide layer formed on the surface of a plate, sheet or foil made of aluminum or an aluminum alloy, using an ink-jet printing process with an ink containing a dye and a volatile component, comprising the steps of:

heating the anodic oxide layer to dehydrate and activate the anodic oxide layer;

imparting ink to the anodic oxide layer having been subjected to heat treatment; and heating the anodic oxide layer immediately after imparting ink in said imparting step to remove the volatile component from the imparted ink and fix the dye contained in the ink into the anodic oxide layer.

36. The process according to claim 32, further comprising a fourth step of sealing pores in the anodic oxide layer after fixing the dye into the anodic oxide layer.

37. The process according to claim 32, wherein the ink comprises multi-color inks to form a multi-colored printed image.

38. The process according to claim 32, wherein the anodic oxide layer has a thickness of from 5 to 25 μm.

39. The process according to claim 32, wherein the ink-jet printing process is a bubble-jet printing process.

40. The process according to claim 32, wherein the volatile component of the ink has an evaporation rate of from $1.0 \times 10^{-5}$ g/mm$^2$·sec to $1.0 \times 10^{-7}$ g/mm$^2$·sec.

41. The process according to claim 32, further comprising a step of applying an aqueous polyvalent metal salt solution to the anodic oxide layer after ink has been imparted in said imparting step.

42. The process for producing a decorative aluminum plate, sheet or foil according to claim 35, wherein the ink further comprises a non-volatile component and the amount per unit area of the non-volatile component imparted to the anodic oxide layer is not more than an ink reception quantity per unit area of pores in the anodic oxide layer.

43. An apparatus for producing a decorative aluminum plate, sheet or foil having an image printed on an anodic oxide layer formed on the surface of a plate, sheet or foil made of aluminum or an aluminum alloy, comprising:

first means for heating the aluminum plate, sheet or foil to dehydrate and activate the anodic oxide layer;

printing head provided adjacent to said first means, having a plurality of ink ejection orifices from which ink is applied to the anodic oxide layer in accordance with an image printing signal, wherein the ink comprises a dye and a volatile component;

second means for heating the aluminum plate, sheet or foil to remove the volatile component from the applied ink and fix the dye contained in the ink in the anodic oxide layer; and third means for transporting the aluminum plate, sheet or foil from said first means to the said second means.

44. The apparatus according to claim 39, further comprising means for detecting the temperature of the aluminum plate, sheet or foil and means for controlling at least one operation of said first and second means in accordance with the information on the temperature obtained by said temperature detecting means.

45. The apparatus according to claim 39, wherein said third means comprises a tray on which the aluminum plate, sheet or foil is placed.

46. The apparatus according to claim 41, wherein said tray comprises means for heating the aluminum plate, sheet or foil.

47. The apparatus according to claim 39, wherein said printing head is an ink-jet printing head.

48. The apparatus according to claim 39, wherein said printing head is a bubble jet printing head.

49. An image forming process for forming an image on an anodic oxide layer formed on the surface of a plate, sheet or foil made of aluminum or an aluminum alloy, using an ink-jet printing process, comprising the steps of:

providing an ink comprising a dye, a volatile component and a non-volatile component; and imparting the ink to the anodic oxide layer to form an image, so that the amount per unit area of the nonvolatile component imparted to the anodic oxide layer is not more than an ink reception quantity per unit area of pores in the anodic oxide layer.

50. An image forming process for forming an image on an anodic oxide layer formed on the surface of a plate, sheet or foil made of aluminum or an aluminum alloy, using an ink-jet printing process with an ink containing a dye and a volatile component, comprising the steps of:

heating the anodic oxide layer to dehydrate and activate the anodic oxide layer;

imparting ink to the anodic oxide layer having been subjected to heat treatment in said heating step; and removing the volatile component from the imparted ink and fixing the dye into the anodic oxide layer.

51. The image forming process according to claim 50, further comprising a step of sealing pores in the anodic oxide layer after fixing the dye into the anodic oxide layer.

52. The image forming process according to claim 50, wherein the ink comprises a plurality of colored inks to form a multi-colored printed image.

53. The image forming process according to claim 50, wherein the anodic oxide layer has a thickness of from 5 to 25 μm.

54. The image forming process according to claim 50, wherein the ink-jet printing process is a bubble-jet printing process.

55. The image forming process according to claim 50, wherein a volatile component of the ink has an evaporation rate of from $1.0 \times 10^{-5}$ g/mm$^2$·sec to $1.0 \times 10^{-7}$ g/mm$^2$·sec.

56. The image forming process according to claim 50, further comprising a step of applying an aqueous polyvalent metal salt solution to the anodic oxide layer after the ink has been imparted in said imparting step.

57. The image forming process according to claim 50, wherein the ink further comprises a non-volatile component and an amount per unit area of the non-volatile component imparted to the anodic oxide layer is not more than an ink reception quantity per unit area of pores in the anodic oxide layer.

58. A process for producing a decorative aluminum plate, sheet or foil having an image printed on an anodic oxide layer formed on the surface of a plate, sheet or foil made of aluminum or an aluminum alloy, using an ink-jet printing process with an ink containing a dye and a volatile component, comprising the steps of:

heating the anodic oxide layer to dehydrate and activate the anodic oxide layer;

imparting ink to the anodic oxide layer having been subjected to heat treatment; and removing a volatile component from the imparted ink and fixing the dye contained in the ink into the anodic oxide layer.

59. The process according to claim 58, further comprising a step of sealing pores in the anodic oxide layer after fixing the dye into the anodic oxide layer.

60. The process according to claim 58, wherein the ink comprises a plurality of colored inks to form a multi-colored printed image.

61. The process according to claim 58, wherein the anodic oxide layer has a thickness of from 5 to 25 μm.

62. The process according to claim 58, wherein the ink-jet printing process is a bubble-jet printing process.

63. The process according to claim 58, wherein a volatile component of the ink has an evaporation rate of from $1.0 \times 10^{-5}$ g/mm$^2$·sec to $1.0 \times 10^{-7}$ g/mm$^2$·sec.

64. The process according to claim 58, further comprising a step of applying an aqueous polyvalent metal salt solution to the anodic oxide layer after the ink has been imparted in said imparting step.

65. The process for producing a decorative aluminum plate, sheet or foil according to claim 58, wherein the ink further comprises a non-volatile component and an amount per unit area of the non-volatile component imparted to the anodic oxide layer is not more than an ink reception quantity per unit area of pores in the anodic oxide layer.

* * * * *

UNITED STATES PATENT AND TRADEMARK OFFICE
CERTIFICATE OF CORRECTION

PATENT NO. : 5,786,835
DATED : July 28, 1998
INVENTOR(S): MASAMI IKEDA, ET AL.

Page 1 of 2

It is certified that error appears in the above-identified patent and that said Letters Patent is hereby corrected as shown below:

Title page, item [56],
REFERENCES CITED

"2187383   7/1990   Japan" should read
--2-187383   7/1990   Japan--.

"0244831   A2   4/1987   European Pat. Off." should read
--0244831   A2   11/1987   European Pat. Off.--.

COLUMN 12, line 61,

"$Al^{++}$." should read --$Al^{+++}$.--.

COLUMN 23

Line 12, "claim 13," should read --claim 14,--.
Line 15, "printing," should read --printing--.
Line 18, "claim 13," should read --claim 14.--.
Line 43, "claim 13," should read --claim 14.--.
Line 49, "According" should read --according--, and "claim 13," should read --claim 14,--.
Line 53, "claim 13," should read --claim 14,--.

COLUMN 24

Line 12, "claim 25," should read --claim 27,--.
Line 18, "claim 25," should read --claim 27,--.
Line 20, "$1.0 \times 10^{-5}$ g/mm²/sec" should read
--$1.0 \times 10^{-5}$ g/mm²·sec--.
Line 22, "claim 25," should read --claim 27,--.

UNITED STATES PATENT AND TRADEMARK OFFICE
CERTIFICATE OF CORRECTION

PATENT NO. : 5,786,835

DATED : July 28, 1998

INVENTOR(S): MASAMI IKEDA, ET AL.

It is certified that error appears in the above-identified patent and that said Letters Patent is hereby corrected as shown below:

COLUMN 24 (Continued)

```
Line 26, "claim 25," should read --claim 27,--.
Line 29, "claim 25," should read --claim 27,--.
Line 53, "claim 32," should read --claim 35,--.
Line 56, "claim 32," should read --claim 35,--.
Line 59, "claim 32," should read --claim 35,--.
Line 61, "claim 32," should read --claim 35,--.
Line 63, "claim 32," should read --claim 35,--.
Line 66, "claim 32," should read --claim 35,--.
```

COLUMN 25

```
Line 26, "claim 39," should read --claim 43,--.
Line 32, "claim 39," should read --claim 43,--.
Line 35, "claim 41," should read --claim 45,--.
Line 39, "claim 39," should read --claim 43,--.
Line 41, "claim 39," should read --claim 43,--.
```

Signed and Sealed this

Thirtieth Day of March, 1999

Attest:

Q. TODD DICKINSON

*Attesting Officer*     Acting Commissioner of Patents and Trademarks